(12) United States Patent
Khan et al.

(10) Patent No.: US 12,184,603 B2
(45) Date of Patent: *Dec. 31, 2024

(54) SYSTEM AND METHOD FOR IDENTITY RESOLUTION ACROSS DISPARATE DISTRIBUTED IMMUTABLE LEDGER NETWORKS

(71) Applicant: THE DUN & BRADSTREET CORPORATION, Short Hills, NJ (US)

(72) Inventors: Saleem Khan, Jersey City, NJ (US); Jacob Caleb Gostylo, Austin, TX (US)

(73) Assignee: THE DUN & BRADSTREET CORPORATION, Jacksonville, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 18/311,399

(22) Filed: May 3, 2023

(65) Prior Publication Data
US 2023/0353531 A1 Nov. 2, 2023

Related U.S. Application Data

(60) Division of application No. 17/701,886, filed on Mar. 23, 2022, now Pat. No. 11,689,492, which is a
(Continued)

(51) Int. Cl.
*H04L 61/103* (2022.01)
*G06F 16/18* (2019.01)
(Continued)

(52) U.S. Cl.
CPC ........ *H04L 61/103* (2013.01); *G06F 16/1805* (2019.01); *G06F 16/27* (2019.01);
(Continued)

(58) Field of Classification Search
CPC . H04L 2209/38; H04L 9/0643; H04L 9/0825; H04L 61/103; H04N 21/4126;
(Continued)

(56) References Cited

U.S. PATENT DOCUMENTS

| | | | |
|---|---|---|---|
| 7,822,757 B2 | 10/2010 | Stoker et al. | |
| 7,925,551 B2* | 4/2011 | Hahn-Carlson | G06Q 30/00 705/30 |

(Continued)

FOREIGN PATENT DOCUMENTS

| | | |
|---|---|---|
| AU | 691447 B1 | 5/1998 |
| CA | 2931469 | 9/2017 |

(Continued)

OTHER PUBLICATIONS

International Search Report dated Nov. 29, 2018 in corresponding International PCT Patent Application No. PCT US2018/054160, 3 pages.
(Continued)

*Primary Examiner* — Shean Tokuta
(74) *Attorney, Agent, or Firm* — Ohlandt, Greeley and Perle, L.L.P.

(57) ABSTRACT

A system and method for identifying previously unknown counterparties by registering distributed ledger public keys and/or addresses associated with specific business entities and/or individuals. The system and method are configured to provide tools for administering public facing distributed ledger identifiers using cryptographic proof messaging and transactions made on the Distributed Ledger. It also provides queries and lookups to discover public keys associated with entities and allows users to link identifiers on competing Distributed Ledgers to a disambiguated entity, thereby enabling cross Ledger transactions to occur.

6 Claims, 13 Drawing Sheets

Related U.S. Application Data continuation of application No. 17/108,786, filed on Dec. 1, 2020, now Pat. No. 11,303,603, which is a continuation of application No. 16/565,635, filed on Sep. 10, 2019, now Pat. No. 10,873,559, which is a continuation of application No. 16/150,790, filed on Oct. 3, 2018, now Pat. No. 10,454,878.

(60) Provisional application No. 62/651,369, filed on Apr. 2, 2018, provisional application No. 62/568,128, filed on Oct. 4, 2017.

(51) Int. Cl.
| | | |
|---|---|---|
| *G06F 16/27* | (2019.01) | |
| *G06Q 20/38* | (2012.01) | |
| *H04L 9/00* | (2022.01) | |
| *H04L 9/06* | (2006.01) | |
| *H04L 9/08* | (2006.01) | |
| *H04L 9/32* | (2006.01) | |

(52) U.S. Cl.
CPC ......... *G06Q 20/382* (2013.01); *H04L 9/0643* (2013.01); *H04L 9/0825* (2013.01); *H04L 9/3239* (2013.01); *H04L 9/3247* (2013.01); *H04L 9/50* (2022.05)

(58) Field of Classification Search
CPC ........... H04N 21/4222; H04N 21/4312; H04N 21/4316; H04N 21/4383; H04N 21/4882; H04N 21/84; H04N 5/50; G06F 16/27; G06F 16/1805
See application file for complete search history.

(56) References Cited

U.S. PATENT DOCUMENTS

| | | | |
|---|---|---|---|
| 8,036,907 B2 | 10/2011 | Davies et al. | |
| 8,346,790 B2 | 1/2013 | Stoker et al. | |
| 8,438,184 B1* | 5/2013 | Wang | H04L 67/02 707/780 |
| 8,459,545 B1* | 6/2013 | Hammer | G06Q 20/3276 705/16 |
| 8,756,117 B1* | 6/2014 | Ballaro | G06Q 10/087 705/26.1 |
| 9,298,806 B1* | 3/2016 | Vessenes | G06F 16/244 |
| 9,355,155 B1* | 5/2016 | Cassel | G06F 3/04842 |
| 9,635,000 B1 | 4/2017 | Muftic | |
| 9,928,272 B1* | 3/2018 | Niyogi | G06F 16/4387 |
| 10,102,526 B1* | 10/2018 | Madisetti | G06Q 20/389 |
| 10,164,931 B2* | 12/2018 | Hameed | G06F 40/197 |
| 10,248,783 B2 | 4/2019 | Costa Faidella et al. | |
| 10,554,649 B1* | 2/2020 | Fields | H04L 9/3263 |
| 10,735,182 B2* | 8/2020 | Jutla | H04L 63/0861 |
| 10,848,382 B1* | 11/2020 | Allshouse | H04L 41/12 |
| 10,873,559 B2* | 12/2020 | Khan | G06Q 20/382 |
| 11,100,502 B1* | 8/2021 | Rainey | H04L 9/3263 |
| 11,303,603 B2* | 4/2022 | Khan | G06F 16/27 |
| 2001/0037333 A1 | 11/2001 | Nishimura | |
| 2007/0239614 A1 | 10/2007 | Tannenbaum | |
| 2011/0258686 A1 | 10/2011 | Raj et al. | |
| 2012/0232955 A1* | 9/2012 | Riazzi | G06Q 30/0204 705/7.32 |
| 2013/0066942 A1* | 3/2013 | Massey | G06F 15/16 709/203 |
| 2013/0086630 A1* | 4/2013 | Kavantzas | H04L 63/10 726/1 |
| 2013/0173604 A1* | 7/2013 | Li | G06F 16/9538 707/723 |
| 2013/0244614 A1* | 9/2013 | Santamaria | H04W 12/069 455/411 |
| 2015/0332256 A1* | 11/2015 | Minor | H04L 9/50 705/69 |
| 2016/0065429 A1* | 3/2016 | Wang | H04L 67/306 709/224 |
| 2016/0267580 A1* | 9/2016 | Unser | G06Q 40/00 |
| 2016/0283941 A1* | 9/2016 | Andrade | G06Q 20/3829 |
| 2016/0300223 A1* | 10/2016 | Grey | G06Q 20/3825 |
| 2016/0330027 A1 | 11/2016 | Ebrahimi | |
| 2016/0342977 A1* | 11/2016 | Lam | G06Q 20/0658 |
| 2017/0011460 A1 | 1/2017 | Molinari et al. | |
| 2017/0046806 A1 | 2/2017 | Haldenby et al. | |
| 2017/0111175 A1* | 4/2017 | Oberhauser | G06Q 20/4014 |
| 2017/0124535 A1* | 5/2017 | Juels | G06Q 20/065 |
| 2017/0132615 A1* | 5/2017 | Castinado | G06Q 20/223 |
| 2017/0177855 A1* | 6/2017 | Costa Faidella | H04L 63/123 |
| 2017/0213221 A1 | 7/2017 | Kurian et al. | |
| 2017/0232300 A1 | 8/2017 | Tran et al. | |
| 2017/0250972 A1* | 8/2017 | Ronda | H04L 9/0891 |
| 2017/0279801 A1 | 9/2017 | Andrade | |
| 2017/0293669 A1* | 10/2017 | Madhavan | G06F 16/2365 |
| 2017/0300912 A1* | 10/2017 | Narasimhan | H04L 63/08 |
| 2017/0330174 A1* | 11/2017 | Demarinis | G06Q 40/04 |
| 2018/0040007 A1* | 2/2018 | Lane | G06Q 30/0201 |
| 2018/0048461 A1* | 2/2018 | Jutla | H04L 9/3268 |
| 2018/0053182 A1* | 2/2018 | Mokhasi | H04L 63/126 |
| 2018/0101684 A1* | 4/2018 | Murphy | G06F 21/64 |
| 2018/0176017 A1* | 6/2018 | Rodriguez | H04L 63/20 |
| 2018/0183768 A1* | 6/2018 | Lobban | H04L 63/061 |
| 2018/0234433 A1* | 8/2018 | Oberhauser | G06Q 20/02 |
| 2018/0285886 A1* | 10/2018 | Yan | G06Q 30/018 |
| 2018/0288022 A1* | 10/2018 | Madisetti | G06Q 20/3829 |
| 2018/0341945 A1* | 11/2018 | Welborn | G06Q 30/0226 |
| 2019/0073646 A1* | 3/2019 | Wright | G06Q 20/3827 |
| 2019/0087793 A1* | 3/2019 | Dickerson | H04L 67/63 |
| 2019/0104102 A1* | 4/2019 | Khan | H04L 61/103 |
| 2019/0147431 A1* | 5/2019 | Galebach | H04L 9/3247 705/44 |
| 2019/0179806 A1* | 6/2019 | Reinsberg | H04L 9/0643 |
| 2019/0251552 A1* | 8/2019 | Kurian | H04L 9/3247 |
| 2019/0272534 A1* | 9/2019 | Griffith | G06Q 20/02 |
| 2019/0303921 A1* | 10/2019 | Mutter | G06F 3/0655 |
| 2020/0005290 A1* | 1/2020 | Madisetti | G06Q 20/065 |
| 2020/0042958 A1* | 2/2020 | Soundararajan | G06Q 20/401 |
| 2020/0076601 A1* | 3/2020 | Tabrizi | H04L 9/0637 |
| 2020/0104839 A1* | 4/2020 | Hayes | G06Q 20/3829 |
| 2020/0127813 A1* | 4/2020 | Millar | G06Q 20/363 |
| 2020/0145366 A1* | 5/2020 | Khan | G06F 16/1805 |
| 2021/0084005 A1* | 3/2021 | Khan | H04L 9/3247 |
| 2021/0084024 A1* | 3/2021 | Sadayoshi | H04L 63/0807 |
| 2021/0174453 A1* | 6/2021 | Anderson | G06Q 10/10 |
| 2021/0357927 A1* | 11/2021 | Kita | G06Q 20/38215 |
| 2021/0360031 A1* | 11/2021 | Novotny | H04L 63/10 |
| 2022/0006846 A1* | 1/2022 | Kumbi | G06F 3/048 |
| 2022/0078010 A1* | 3/2022 | Olson | H04L 67/1044 |
| 2022/0188819 A1* | 6/2022 | Ognjanovic | H04L 9/3236 |
| 2022/0198562 A1* | 6/2022 | Cella | G06Q 40/04 |
| 2022/0209962 A1* | 6/2022 | Tarnow | H04L 9/3252 |
| 2022/0217113 A1* | 7/2022 | Khan | H04L 61/103 |

FOREIGN PATENT DOCUMENTS

| | | | |
|---|---|---|---|
| CA | 2931469 A1 | 9/2017 | |
| CN | 102881239 A | 1/2013 | |
| CN | 104320262 A | 1/2015 | |
| CN | 106131675 A | 11/2016 | |
| CN | 107133567 A | 9/2017 | |
| CN | 111628867 A * | 9/2020 | |
| WO | 2016/170538 | 10/2016 | |
| WO | 2016-170538 A1 | 10/2016 | |
| WO | WO-2017136956 A1 * | 8/2017 | ............ G06F 16/27 |
| WO | WO-2020048241 A1 * | 3/2020 | ............ H04L 63/06 |
| WO | WO-2021229404 A1 * | 11/2021 | ........ G06F 16/2379 |

OTHER PUBLICATIONS

Written Opinion dated Nov. 29, 2018 in corresponding International PCT Patent Application No. PCT/US2018/054160, 4 pages.
International Preliminary Report on Patentability dated Apr. 16, 2020 in corresponding International PCT Patent Application No. PCT/US2018/054160, 6 pages.

(56) References Cited

OTHER PUBLICATIONS

Extended European Search Report dated May 31, 2021 in related European Patent Application No. EP18865175.6, 9 pgs.
Chinese Office Action dated Dec. 8, 2023 for Chinese Appl. No. 2021105044839.
Extended European Search Report dated Sep. 23, 2024 for European Application No. 24184380.4.

* cited by examiner

SYSTEM AND METHOD FOR IDENTITY RESOLUTION ACROSS DISPARATE DISTRIBUTED IMMUTABLE LEDGER NETWORKS

CROSS REFERENCE TO RELATED APPLICATIONS

The present application is a divisional application of U.S. patent application Ser. No. 17/701,886, of the same title and filed on Mar. 23, 2022, which is in turn a continuation of U.S. patent application Ser. No. 17/108,786, of the same title and filed on Dec. 1, 2020, which is in turn a continuation of U.S. patent application Ser. No. 16/565,635, of the same title and filed on Sep. 10, 2019, which is a continuation of U.S. patent application Ser. No. 16/150,790, also of the same title and filed on Oct. 3, 2018, which claims priority to U.S. Provisional Patent Application No. 62/568,128, also of the same title and filed on Oct. 4, 2017, and U.S. Provisional Patent Application No. 62/651,369, of the same title and filed on Apr. 2, 2018, the entirety of each which is incorporated by reference hereby.

DESCRIPTION OF RELATED TECHNOLOGY

In a Distributed Ledger system, identity is based on the cryptographic private key held by the user. This private key resolves to a public key, which is then shared, and is used to identify and give permission to conduct transactions on the Distributed Ledger to the private key holder. All users may generate any number of private keys to use, but a user may wish to tie their persona to a particular public key.

Furthermore, Distributed Ledgers that form different networks cannot trust actions taken on other Distributed Ledgers, and users may wish to have their identity linked between Distributed Ledgers so as to complete transactions across competing Ledgers.

One solution to this problem is set forth in US Patent Publication No. 2016/0330027, entitled "Identity Management Service Using a Blockchain Providing Certifying Transactions between Devices". This publication discloses logic on a first remote device and receives a first transaction number and personal data transmitted from a second remote device. The first transaction number is received from a distributed public database in response to a transmission, from the second remote device, of a signed hash value and a first public key associated with a first private key on the second remote device. The signed hash value is created by signing a hash value with the first private key, and the hash value is generated by hashing the personal data with a hashing algorithm on the second remote device. The logic uses the first transaction number to retrieve the signed hash value and the first public key from the distributed public database. The logic hashes the personal data using the hashing algorithm to create a generated hash value and verifies the signed hash value against the generated hash value.

Distributed Ledgers are effective systems for entities to send transactions in a trusted way based on the Ledger's requirement that interaction must be done through asymmetric cryptography where the only person able to generate a valid transaction is the proper private key holder, as well as the Ledger's ability to trust past transactions made in its own ecosystem (i.e., its own transactional history).

There are two drawbacks when parties transact in Distributed Ledgers where the parties need to be unambiguously identified for purposes of regulation or business dealings. The first is that on most Distributed Ledgers, a counterparty can generate any number of IDs or addresses with which to make transactions. Public keys and addresses are non-deterministic, and in many cases, entities cannot create similar or meaningful public addresses to identify themselves with. The ability to spontaneously generate valid IDs makes it difficult to identify whom each ID belongs to—often this is considered a best practice. The second is that while a Distributed Ledger can trust its own history, disparate Distributed Ledgers cannot trust each other's histories, and therefor transactions cannot occur between them without a third-party arbiter or oracle.

It would be advantageous to have a system that links identities or addresses of Distributed Ledgers to a single unifying ID representing a physical entity, and to further link that unifying ID to additional descriptive attributes in order to disambiguate and accurately identify counterparties in a transaction.

The present disclosure also provides many additional advantages, which shall become apparent as described below.

SUMMARY

The present disclosure generally relates to systems and methods of cross-linking identities or addresses that are part of disparate Distributed Ledger systems but are controlled by single entities. Distributed Ledgers represent an emerging technology that can increase the efficiency of business transactions.

The present disclosure describes a system and method for identifying previously unknown counterparties by registering distributed ledger public keys and/or addresses associated with specific business entities and/or individuals. The system and method serve as a lookup function for all public keys on various distributed ledgers, e.g., blockchain, networks that roll up to one master identification number and associate the various public keys or addresses with specific corporate identity information associated therewith. The object of which is to provide transparency, risk mitigation and efficiency via a centralized service when dealing with unknown counterparties.

The present disclosure acquires and maintains public keys or "addresses" and associates those keys to a disambiguated entity. It allows for entities to administer their pool of public facing Distributed Ledger identifiers using cryptographic proof messaging and transactions made on the Distributed Ledger. It also allows queries and lookups to discover public keys associated with entities and allows users to link identifiers on competing Distributed Ledgers to a disambiguated entity, thereby enabling cross Ledger transactions to occur.

Additionally, the disclosure allows for the unique identification of a corporate entity and its public keys in order to perform due diligence in the form of Know Your Customer and Anti-Money Laundering checks. This is a key requirement for regulated institutions to conduct business.

In an embodiment, described is a method for a platform host comprising: providing a hub server connected to an ID resolution server, the ID resolution server being configured to perform identity resolution for a single entity on a plurality of distributed ledger networks; and connecting a plurality of distributed ledger network platform nodes on each of a respective plurality of the distributed ledger networks to the hub server. The method can further comprise: embedding the plurality of the distributed ledger network platform nodes on a respective plurality of the distributed ledger networks.

The method can further comprise: linking a plurality of public key distributed ledger addresses to an Entity ID for an entity; and linking each of the public key distributed ledger addresses to their respective distributed ledger network. The method can further comprise: generating a datastore for the Entity ID; and linking each of the public key distributed ledger addresses to their respective distributed ledger network in the datastore. The method can further comprise: generating a plurality of the datastores; and storing a plurality of the datastores in an identity resolution database lookup table, wherein the ID resolution server comprises the identity resolution database lookup table.

In an embodiment, described is a method for a platform host comprising: receiving, at a platform node server, notice of an event on a smart contract on a distributed immutable ledger; sending, from the node server, enrichment instructions for a party interested in being a counterparty to the smart contract to a hub server; determining, at the hub server, whether the party is authorized to receive business entity firmographic information for counterparties to the smart contract; resolving, at an ID resolution server, an Entity ID for the party interested in being a counterparty to the smart contract on the distributed ledger network; obtaining, by the hub server, business entity firmographic information about the party from a business information database server; and outputting, by the hub server, the business entity firmographic information for the party to the platform node server.

The method can further comprise: resolving, at an ID resolution server, an Entity ID for a plurality of parties interested in being counterparties to the smart contract on the distributed ledger network. The method can further comprise: resolving, at an ID resolution server, an Entity ID for one or more counterparties to the smart contract on the distributed ledger network. The method can further comprise: generating, by the platform node sever, a transaction to the smart contract. The method can further comprise: sending, by the hub server, the counterparty information for the party to the ID Resolution Server. The method can further comprise: obtaining, by the hub server, business entity firmographic information about one or more counterparties to the smart contract from a business information database server; and receiving, at the platform node server business entity firmographic information for the one or more counterparties to the smart contract.

In an embodiment, described is a system for verifying entities on a distributed immutable ledger comprising: a network computer comprising: a hub server; an ID resolution server; a memory for storing a database and program instructions; and a processor device that is operative to execute program instructions that enable actions, comprising:
  providing a hub server connected to an ID resolution server, the ID resolution server being configured to perform identity resolution for a single entity on a plurality of distributed ledger networks; and
  connecting a plurality of distributed ledger network platform nodes on each of a respective plurality of the distributed ledger networks to the hub server.

In an embodiment, the system can be further configured to execute program instructions that enable actions comprising: linking a plurality of public key distributed ledger addresses to an Entity ID for an entity; and linking each of the public key distributed ledger addresses to their respective distributed ledger network. In an embodiment, the system can be further configured to execute program instructions that enable actions comprising: generating a datastore for the Entity ID; linking each of the public key distributed ledger addresses to their respective distributed ledger network in the datastore. In an embodiment, the system can be further configured to execute program instructions that enable actions comprising: generating a plurality of the datastores; and storing a plurality of the datastores in an identity resolution database lookup table, wherein the ID resolution server comprises the identity resolution database lookup table. The system can be further configured to execute program instructions that enable actions comprising: embedding a plurality of the distributed ledger network platform nodes on a respective plurality of the distributed ledger networks.

In an embodiment, described is a system for verifying entities on a distributed immutable ledger comprising: a network computer comprising: a hub server; an ID resolution server; a memory for storing a database and program instructions; and a processor device that is operative to execute program instructions that enable actions, comprising: receiving, at a platform node server, notice of an event on a smart contract on a distributed immutable ledger;
  sending, from the node server, enrichment instructions for a party interested in being a counterparty to the smart contract to a hub server;
  determining, at the hub server, whether the party is authorized to receive business entity firmographic information for counterparties to the smart contract;
  resolving, at an ID resolution server, an Entity ID for the party interested in being a counterparty to the smart contract on the distributed ledger network;
  obtaining, by the hub server, business entity firmographic information about the party from a business information database server; and
  outputting, by the hub server, the business entity firmographic information for the party to the platform node server.

The system can be further configured to execute program instructions that enable actions comprising: resolving, at an ID resolution server, an Entity ID for a plurality of parties interested in being counterparties to the smart contract on the distributed ledger network.

The system can be further configured to execute program instructions that enable actions comprising: resolving, at an ID resolution server, an Entity ID for one or more counterparties to the smart contract on the distributed ledger network. The system can be further configured to execute program instructions that enable actions comprising: generating, by the platform node sever, a transaction to the smart contract. The system can be further configured to execute program instructions that enable actions comprising: sending, by the hub server, the counterparty information for the party to the ID Resolution Server. The system can be further configured to execute program instructions that enable actions comprising: obtaining, by the hub server, business entity firmographic information about one or more counterparties to the smart contract from a business information database server; and receiving, at the platform node server business entity firmographic information for the one or more counterparties to the smart contract.

The system can be further configured to execute program instructions that enable actions comprising: routing the request from the hub server to a business information database server; obtaining business entity firmographic information about the counterparty from the business information database server; and outputting the business entity firmographic information to the platform node. The business entity firmographic information can include business linkage information. The system can be further configured to execute program instructions that enable actions comprising: automatically executing, by the platform node, a transaction to the distributed immutable ledger.

Further objects, features and advantages of the present disclosure will be understood by reference to the following drawings and detailed description.

DETAILED DESCRIPTION OF EMBODIMENTS

Figure 1A:
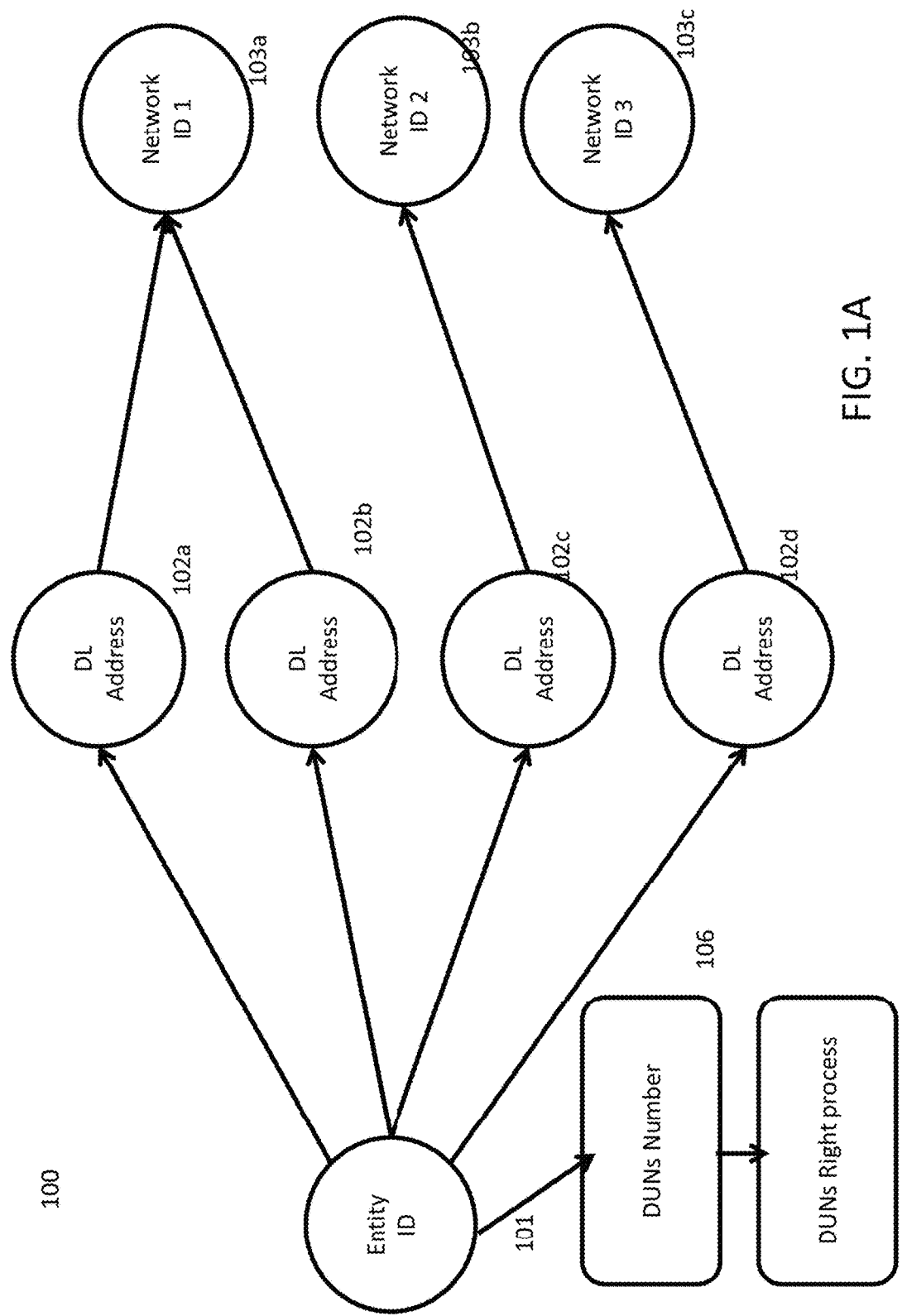
FIG. 1A is a datastore graph according to the present disclosure depicting how multiple Distributed Ledger networks can have multiple Distributed Ledger addresses which all roll up or map to a single entity identification.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of a hardware embodiment, a software embodiment, or an embodiment combining software and hardware aspects.

Throughout the specification and claims, the following terms take the meanings explicitly associated herein, unless the context clearly dictates otherwise. The term "herein" refers to the specification, claims, and drawings associated with the current application. The phrase "in at least one embodiment" or "in an embodiment" as used herein does not necessarily refer to the same embodiment, though it may. Furthermore, the phrase "in another embodiment" as used herein does not necessarily refer to a different embodiment, although it may. Thus, as described below, various embodiments of the innovations described herein may be readily combined without departing from the scope or spirit of these innovations.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in this application, the terms "component," "module" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server, and the server can be a component. One or more components may reside within a process and/or thread of execution, and a component may be localized on one computer and/or distributed between two or more computers.

Furthermore, the detailed description describes various embodiments for illustration purposes, and embodiments include the methods described and can be implemented using one or more apparatus, such as processing apparatus coupled to electronic media. Embodiments may be stored on an electronic media (electronic memory, RAM, ROM, EEPROM) or programmed as computer code (e.g., source code, object code or any suitable programming language) to be executed by one or more processors operating in conjunction with one or more electronic storage media.

One embodiment involves the creation of a centralized system that can write to a Distributed Ledger by (a) providing a unique identifier for the business needed to be identified, (b) appending basic company identifying information provided by a trust authority, and (c) linking all known public keys in various Distributed Ledger networks to the unique identifier created to identify the company.

In an embodiment, a verification system is built to ensure the public keys linked to the master company identifier do, in fact, belong to the company. This can involve different multifactor verification schemes including (a) participating in the Distributed Ledger network and requesting specific payment or data to be sent as a transaction to a platform or verification host's address showing that the company owns the public key in question, (b) having the company cryptographically sign a message with the key pair they want linked and placing that signature in a space under their internet domain proving that they own both the key and the domain, (c) sending a message via text to a phone that is known to be owned by the company and receiving the cryptographic signature in response, and (d) speaking with someone at the company at a business phone number that has been verified.

In another embodiment, a request is sent via network protocols to a server by a first remote device. The request contains an ID or distributed ledger address of an individual Distributed Ledger account. The ID can be, for example, a number assigned by a business entity information platform, for example, a DUNS number, or the ID can be another unique identifier, or both. The server logic will perform a lookup of that ID or address, and if it is found returns to the requester information associated with that ID or address including the particular Distributed Ledger network the ID belongs to, the entity the ID belongs to, other Distributed Ledger network IDs either on the same network or in other networks, the Distributed Ledger network each of these IDs belong to, and firmographic or other attribute data associated with the entity that owns the ID.

In still another exemplary embodiment, the first remote device has a request similar to the first method but also includes information to filter the response to only retrieve information about a particular Distributed Ledger network or only firmographic information about the entity that owns the ID. The server logic can be configured to perform a lookup of the ID or address and return only the found information which the first remote device specified.

In yet another example embodiment, if an entity wishes to add an ID or address to the lookup table on the server, they may submit a request via network protocols to a server that includes the ID or address that they wish to register as a parameter. The system is configured to give a response to the requester that includes a unique string of data. The requester uses the private key associated with the ID or address to generate a signature of the data and uploads the signature as a file to a domain they are registered to control. The requester notifies the server platform through any means of communication that the data is available at their domain. The server is configured to download and verify the signature against the address and the unique string. If the signature is verified, the ID or address is associated with the entity. Otherwise, the system is configured to reject the request, and no action will be taken.

In still another example embodiment, if an entity wishes to add an ID or address to the lookup table on the server, they can contact the owner of the server, and the owner may verify and disambiguate the identity of the entity through means such as a registered telephone number, a text to a registered mobile number, a registered email address, or a personal visit with the entity. When the entity has been identified, a verification of the Distributed Ledger ID can be verified either through decryption of a unique message encrypted to with the ID in question, or verification of a signature of a unique message as signed by the private key, and verified by the ID, or the entity broadcasting a valid transaction on the Distributed Ledger with unique data as agreed upon with the owner of the server.

In another example embodiment, if an entity wishes to add a new ID or address to the lookup table on the server and already has a verified ID registered in the lookup table, the entity may simultaneously verify themselves and the new key they are registering by signing an instructional piece of data with both the new key and the previously verified key. Otherwise, they may broadcast a transaction on the new Distributed Ledger with a signature from the verified key included in the data payload of the transaction. This may be included as data in a smart contract, for example in an embodiment, in the OP_RETURN section of a transaction depending on the method of the Distributed Ledger.

In another exemplary embodiment, if the first entity wishes to automate a transaction to occur and resolve on two or more disparate Distributed Ledgers, and wants to ensure they are transacting with the same entities on those Ledgers, or at least, that they are transacting with entities they can identify, the first entity and can write in code certain logic in smart contracts that allows for necessary state changes to be conducted by the platform host. The platform is configured to act as an oracle, providing that state changes necessary for the fulfillment of the smart contract be conducted in transactions if the oracle can verify identities in a way that satisfies the intent of the contract. These state changes may be coded in as updates to a smart contract or may be providing a signature necessary for a multi-signature transaction to be made valid. The platform is configured to employ a lookup table to ensure proper output routing of transactions for payment and can check smart contract states to verify that the party ABC in the contract on Distributed Ledger XYZ is the same entity as party DEF in the contract on Distributed Ledger UVW.

In an example embodiment, if the first entity wishes to automate business rules in a transaction that are to occur and resolve on any number of Distributed Ledgers, the first entity can code logic into smart contracts that allows for necessary state changes to be conducted by the system. The platform is configured to act as an oracle, providing the state changes necessary for the fulfillment of the smart contract to be conducted in transactions. The system is configured to employ the lookup table that links to firmographic data and other attributes. The system is configured to both read specifications or logic from the smart contract and decide whether to update the state through a transaction, or the system can be configured to provide the data to the smart contract and allow for the contract's own internal logic to decide whether the contract can proceed.

For example, in an embodiment, a smart contract is set up to be discoverable by anyone in the network, and anyone in the network is able to join as a counterparty. When a party on the network discovers the contract and wishes to fulfill the role of the counterparty, the party submits a transaction declaring themselves a counterparty candidate. This transaction changes the state of the smart contract. This state change triggers an event that the node server listens for. The event contains information about the party that just submitted the transaction as well as the contract terms that the counterparty must fulfill. An example of this contract term might be that the counterparty must have a minimum credit risk score, or that they are in good standing against standard terrorist watch lists. The contract is coded in a way that it cannot continue until the node submits another transaction declaring the fulfillment of the contract terms by the counterparty.

In another embodiment, a smart contract is set up between two parties and the contract is coded in such a way that it cannot continue until a contract is examined on another blockchain and it is verified that the parties on that separate contract are the same as the parties on the first contract. The node would submit a transaction to the contract declaring the truth of the identity of the parties. Because the node is an active member of the blockchain, the code can stipulate that only the node is permissioned to make this particular transaction.

In an embodiment, FIG. 1A illustrates a logical architecture for a datastore 100 according to the present disclosure depicting how multiple distributed ledger networks can have multiple distributed ledger addresses which all roll up or map to a single entity identification.

In FIG. 1 a unique entry as an Entity ID 101 is made into a datastore to represent and identify a legal entity, which can be employed in a lookup table. The entity is in possession of distributed ledger addresses 102a-102d that are the numeric representations or public keys. The datastore is configured to these public key addresses to the unique entry 101. Additionally, the datastore contains information about various distributed ledger networks 103a-103d and the distributed ledger addresses 102a-102d are linked to the network, where they represent the unique entry. Additionally, in an embodiment, the system is configured to link the Entity ID 101 to a unique business information identification, for example, a DUNS number 106 or other unique identifier. The structure of the datastore 100 is configured to allow faster and more efficient searching and identity resolution of entities as well as providing an implementation structure for leveraging multiple distributed immutable ledger networks as described herein.

Figure 1B:
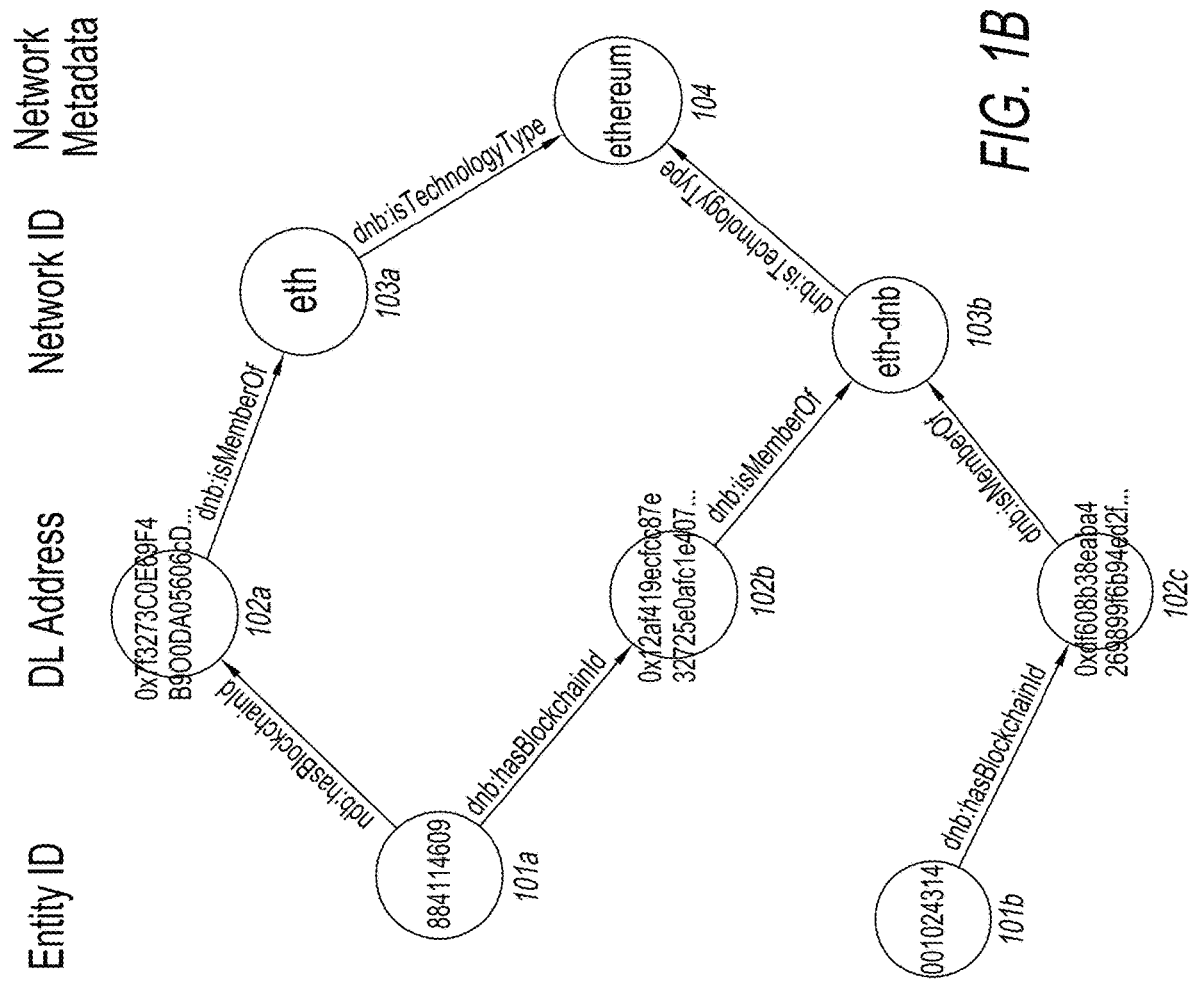
FIG. 1B is an example of a search and resolution of employing the datastore graph of FIG. 1A.

For example, FIG. 1B shows an exemplary graph image for a query on the data store. This query is configured to efficiently find an entity by searching for an address and then builds out the information about the entity including all other addresses associated with that entity and the metadata 104 defining the addresses and networks. In the example, the format of this query is RDF triples written in Turtle notation, however other exemplary formats can be employed.

```
PREFIX dnb: <http://onto.dnb.com/schema#>
PREFIX blockchainId: <http://onto.dnb.com/blockchainId#>
PREFIX entity: <http://onto.dnb.com/entityId#>
PREFIX: blockchainInstance: <http://onto.dnb.com/blockchainInstance#>
select ?entity ?companyName ?duns ?blockchainId ?networkName
?isVerified
?networkTechType where {
    ?interimBCId rdf:value '<address to search for>'.
    ?entity dnb:hasBlockchainId ?interimBCId.
    ?entity dnb:hasBlockchainId ?blockchainURI.
    ?blockchainURI rdf:value ?blockchainId.
    ?blockchainURI dnb:isMemberOf ?network.
    ?blockchainURI dnb:isVerified ?isVerified.
    ?network dnb:hasName ?networkName.
    ?network dnb:isTechnologyType ?techType.
    ?techType dnb:hasName ?networkTechType.
    ?entity dnb:hasName ?companyName.
    ?entity dnb:hasDuns ?duns.
```

As the example shows, the structure of the datastore 100 allows the leveraging of multiple distributed immutable ledger networks for embodiments as described herein, including for, inter alia, smart contracts execution and entity and transaction verification as also described herein. It also is configured for fast and efficient searching and identity resolution of entities on distributed immutable ledgers. This in turn can be leveraged for firmographic enrichment for, inter alia, entities verified to and resolved via the database.

Figure 2A:
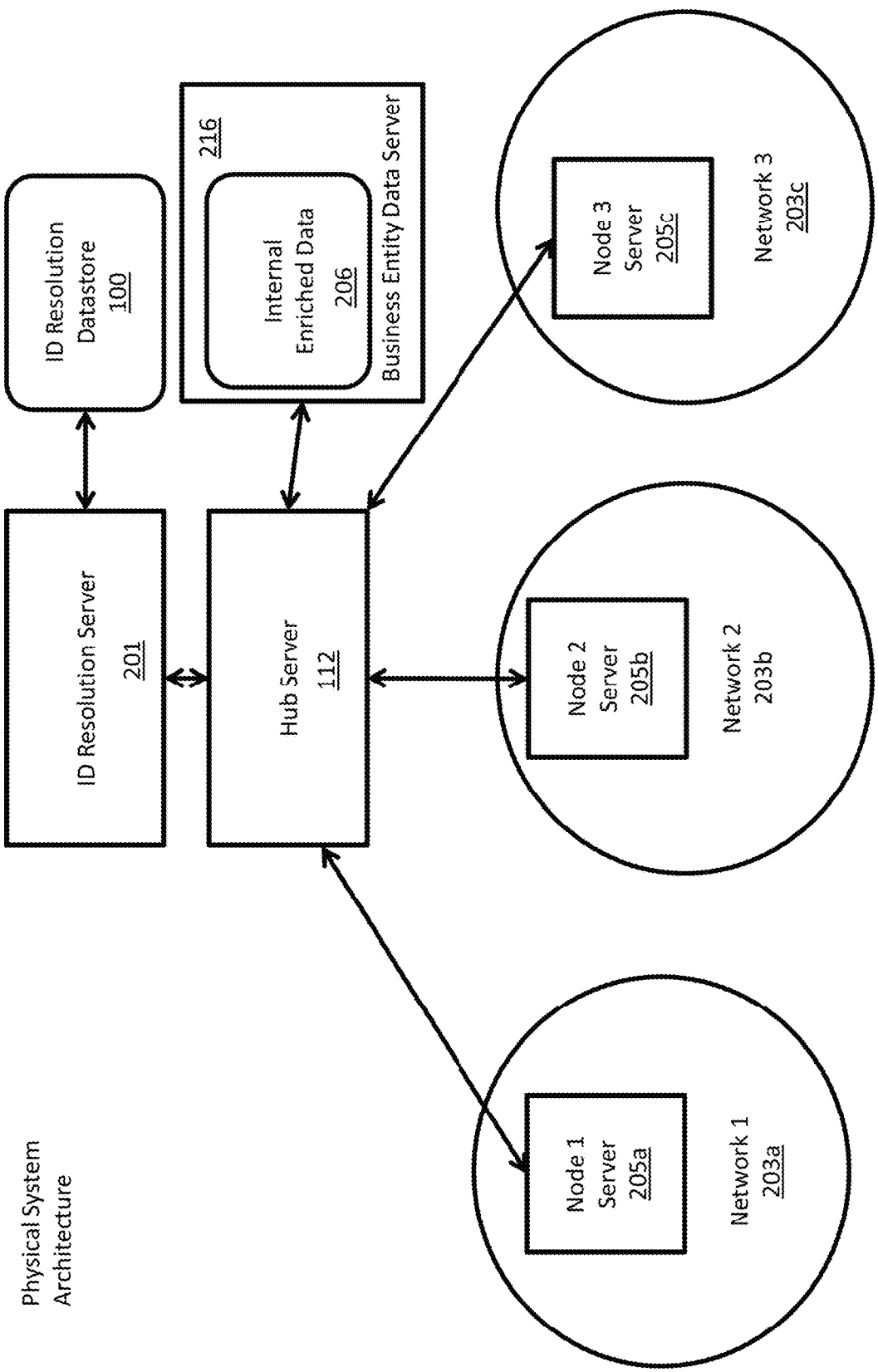
FIG. 2A is the system architecture according to the present disclosure wherein a plurality of nodes is embedded within a plurality of distrusted ledger networks, and in communication with a hub server which communicates with an identification resolution server according to the present disclosure.

FIG. 2A describes an embodiment of a system architecture 200 according to the present disclosure, wherein a plurality of platform nodes is embedded within a plurality of distrusted ledger networks and in communication with a hub server 112 which communicates with an identification resolution server 201.

The distributed immutable ledger 203 is a shared ledger that can be either public or private for recording the history of electronic business transactions that take place in a peer-to-peer (P2P) business network. A distributed immutable ledger is an example of a distributed immutable transaction ledger. A distributed immutable ledger network is a decentralized system for the exchange of assets and recording of transactions. A distributed immutable ledger network may use "Proof of Work," or another consensus mechanism, as a basis of trust, accountability, and transparency. However, distributed immutable ledger networks have no basis of trust outside of the network boundaries. In an embodiment, each permissioned node of the network has a replicated copy of the ledger, and within the network, all events on the ledger are synched across all nodes forming the network and are immutable, resulting in full transparency for all node members.

A transaction system for a distributed immutable ledger can include digital signatures, cryptographic hashes, a time-stamp server, and a decentralized consensus protocol that member nodes use to agree on ledger content. In a public ledger, integrity, privacy, and security are engineered in. For example, a blockchain ledger is comprised of unchangeable, digitally recorded data in packages called blocks. These digitally recorded "blocks" of data are stored in a linear chain. Each block in the chain contains data (e.g., for a cryptocurrency transaction, or a smart contract executable), that is cryptographically hashed. The blocks of hashed data draw upon the previous-block (which came before it) in the chain, ensuring all data in the overall "blockchain" has not been tampered with and remains unchanged. A distributed immutable ledger peer-to-peer network is resilient and robust thanks to its decentralized topology architecture. As member nodes join or leave the network dynamically, messages are exchanged between the network participants on a best-effort broadcast basis.

Exemplary distributed immutable ledger networks include Bitcoin, Ethereum, Ripple, Hyperledger, Stellar, IBM Blockchain, and other enterprise solutions.

Ethereum, for example, is a programmable distributed immutable ledger blockchain. Ethereum allows users to create their own operations of any complexity. In this way, the Ethereum distributed immutable ledger platform can support many different types of decentralized blockchain applications, including but not limited to cryptocurrencies and smart contracts. Ethereum comprises a suite of protocols that define a platform for decentralized applications. The platform comprises an Ethereum Virtual Machine ("EVM"), which can execute code of arbitrary algorithmic complexity. Developers can create applications that run on the EVM using friendly programming languages modelled on existing languages, for example, JavaScript and Python.

For another example, the IBM blockchain implementation called Hyperledger Fabric is configured users to create their own operations of any complexity. The permissioning in the Hyperledger Fabric network is native to the Hyperledger Fabric network. Instead of an architecture that allows anyone to participate by default, participants in any Hyperledger Fabric network must be granted permission to participate by a Root Certificate Authority. Hyperledger Fabric also allows the submission of transactions in channels; users can create and send transactions only to certain parties, and not to the network as a whole.

A distributed immutable ledger or blockchain includes a peer-to-peer network protocol. A distributed immutable ledger database is maintained and updated by many nodes connected to a network. For example, nodes in the same network can run and execute the same instruction for massive parallelization of computing across the entire network. This maintains consensus and immutability for the transactions and events on the ledger. Decentralized consensus imbues the blockchain with high fault tolerance, ensures zero downtime, and makes data stored on the distributed immutable ledger forever unchangeable and censorship-resistant.

Nodes can download a distributed immutable ledger application that provides a gateway to decentralized applications on a network blockchain. For example, a distributed immutable ledger application can be configured to hold and secure crypto-assets built on the blockchain, as well as to code, deploy and employ, inter alia, self-executing smart contracts.

On the distributed immutable ledger network 203, users can set up a node that replicates the necessary data for all nodes to reach an agreement and be compensated by users. This allows user data to remain private and applications to be decentralized. A distributed immutable ledger can also enable developers create, inter alia, fully automated applications that, for example, store registries of debts or promises, send messages, move funds in accordance with predetermined instructions, including encoding those given long in the past (e.g., like a will or a futures contract).

As will be appreciated, one or more of the embodiments of a platform as described herein are configured to leverage multiple, independent private or public distributed immutable ledger networks, including those referenced herein.

Distributed Immutable Ledger Server Computers include virtually any network computer capable of sharing a ledger across a network and configured as a distributed immutable ledger node, including client computers and network computers as described herein. Distributed Immutable Ledger Server Computers are distributed across one or more distinct network computers in a peer-to-peer architecture. Other configurations, and architectures are also envisaged.

In an embodiment, a distributed immutable ledger network 203 can be private to the parties concerned, permissioned so only authorized parties are allowed to join, and can be secure using cryptographic technology to ensure that participants only see what they are allowed to see. The shared ledger is replicated and distributed across the networked computers. Transactions are immutable (unchangeable) and final. Computers that may be arranged to operate as Distributed Immutable Ledger Server Computers include various network computers, including, but not limited to personal computers, desktop computers, multiprocessor systems, microprocessor-based or programmable consumer electronics, network PCs, server computers, network appliances, and the like.

FIG. 2A is a representation of an embodiment of a physical architecture of computer servers. A client software "node" 205 operates on a machine that is part of a private or public network 203. Through one of several mechanisms described herein, another party in the same network will communicate a need for business entity information and distributed ledger identification information to the node 205. That node communicates the desired request to a centralized Hub Server 112 for a platform host. An exemplary request is to identify counterparties in a transaction based on the public key 102 and can also contain a request to enrich the counterparty data with firmographic or risk scoring information from a Business Entity Information Database 206. In an embodiment, one way that a node 205 can be given a request is through event systems built into the distributed ledger 203. The node software 205 can subscribe to listen to events designated as important and the event can trigger the software 205 to make the communication to the Hub Server 112. A platform node 205 can also be given a request is directly through a transaction. If the platform host's node address on that network 203 is specifically identified in a transaction, then the platform node software 205 will use that as an event that can then trigger the software to make the necessary communication to the Hub Server 112.

The Hub Server 112 is configured to translate the request and route the specific request to the subsequent correct services. The Hub Server 112 can include decisioning logic configured to read the request code and determine request information, such as who is transmitting the request via the node and request instructions. For example, the Hub Server 112 can confirm identity X, confirm that the party is looking for ID Y, and provide other request information available to the platform (e.g., business scores, credit scores, firmographic scoring, firmographic data, etc.). A trust weight can be applied for a number of factors, for example, whether a party has verified itself or otherwise been confirmed to the platform. The Hub Server 112 asks who is sending, and the logic confirms the sender and searches for entitlements for that company. A company confirms that they want to claim that they are unique and instantiates a new company at a point of transaction verification.

Verification for companies can be asynchronous—for example, a process request for the company verification ("yes you are verified") and the other company is percent %% verified. In an embodiment, the other company may be known to the platform but not fully verified. For example, the platform can have confirmation that the other company is on one or more distributed ledgers, but the other company has not fully verified itself to the platform, or has not identified itself to the distributed ledger of interest to the requesting party. Distributed ledger addresses 102 are passed to the ID Resolution Server 201, which is configured to access and search the entity resolution datastore 100 lookup table described in FIG. 1 to return an Entity ID (e.g., a DUNS number 106), network identity 103, and other distributed ledger addresses 102a . . . 102n to the Hub Server 112.

In another embodiment, a trust weight can be applied for other factors, for example voluntary transparency. For example, a Hyperledger allows users to hide information, whereas Ethereum does not. A trust weight can be applied based on this transparency and other factors, for example, whether a party chooses to share ledger information that it could otherwise hide with the platform hub.

With the Entity ID obtained, the Hub Server 112 can make requests to other databases and servers, for example, a Business Entity Data Server 216, to enrich the data about the found counterparties. When the requested information from the node 205 has been fulfilled and enriched by the business entity data server, the hub server passes the information back to the node server 205. The platform Node Server 205 is configured to then create and transmit a transaction into the private or public network fulfilling the request for the data.

Business Entity Data Server 216 can also include a business entity information database 206 of robust company/business entity data to map to and enrich the counterparty entity information with company firmographic data from a firmographic database 206 as described herein. In at least one of the embodiments, the firmographic data from the business entity information database 206 can include scores or other rankings for companies. In at least one of the embodiments the business entity information database 206 can include one or more databases linked to business entity information, for example an employee database including employee names and title or management code, a contact database of contacts for employees of companies (e.g., email, mobile device IDs, phone), or a cookie database of data compiled from cookies a business entity uses for digital tracking and digital campaigns. Data from database 206 can be mapped to companies using a mapping module. In at least one of the various embodiments, if the company name is not identified in the business entity information database the system can be configured to generate an identifier and generate one or more firmographic record for the company. In an embodiment, entity information can be enriched with corporate and business linkage information mapping, for example, linking business relationships (e.g., family-tree relationships such as parent/subsidiary, corporate families, global headquarters, branches). Non limiting examples of company entity data linking, generating firmographic record and scoring for companies, and data integration by business entity information database 206 and a business analytics server are described in U.S. Pat. No. 7,822,757, filed on Feb. 18, 2003 entitled System and Method for Providing Enhanced Information, U.S. Pat. No. 8,346,790, filed on Sep. 28, 2010 and entitled Data Integration Method and System, and U.S. Pat. No. 8,036,907 filed on Dec. 23, 2003 and entitled Method and System for Linking Business Entities Using Unique Identifiers, the entirety of each of which is incorporated by reference herein.

Figure 2B:
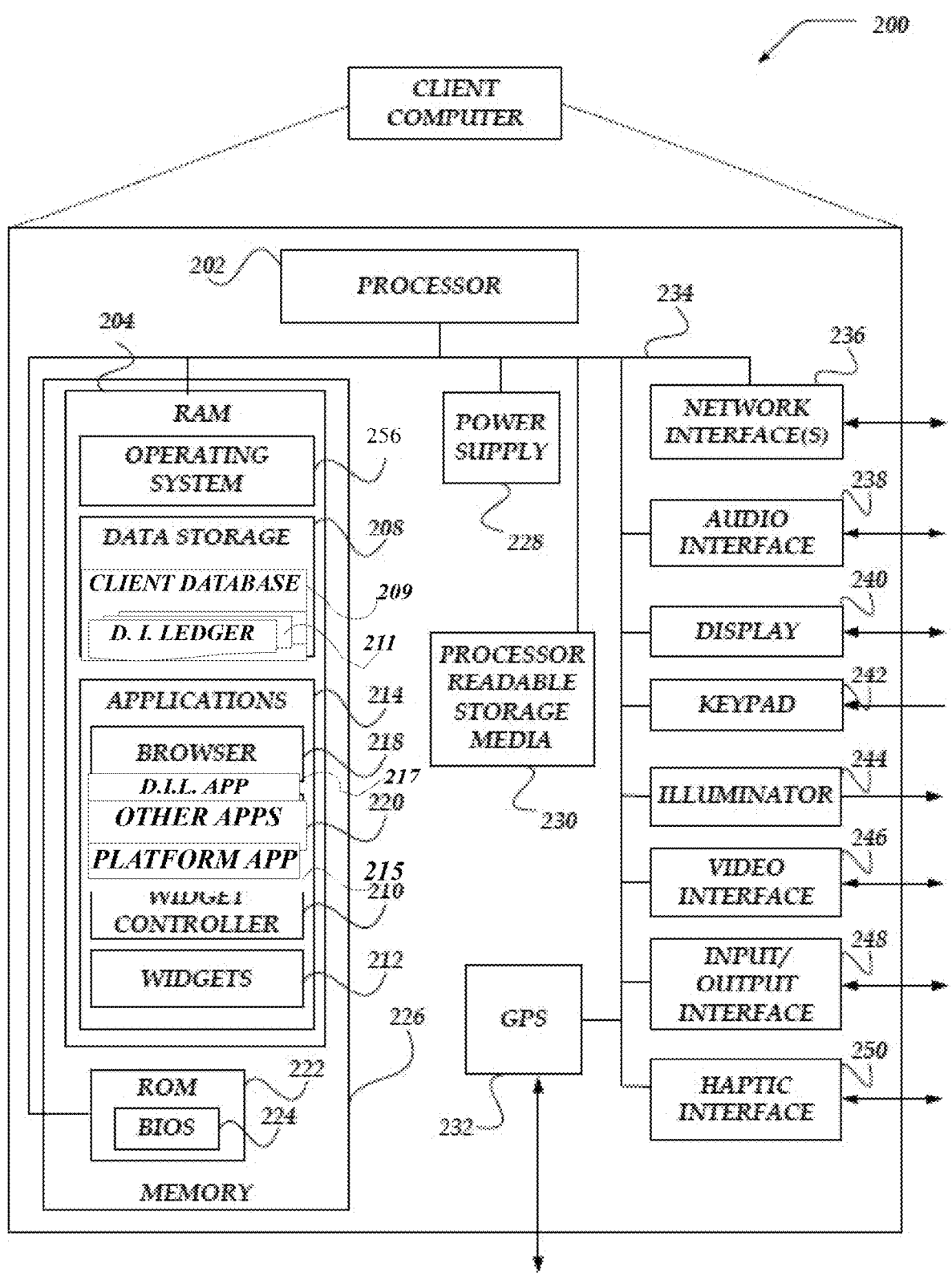
FIG. 2B depicts an exemplary client computer according to the present disclosure.

FIG. 2B shows one embodiment of client computer 207 that may be included in a system implementing embodiments. Client computer 207 may include many more or less components than those shown in FIG. 2A. However, the components shown are sufficient to disclose an illustrative embodiment for practicing the present invention. Client computer 207 may represent, for example, one embodiment of at least one of client computers of a distributed ledger network party, counter-party, or business entity using the platform.

As shown in the figure, client computer 207 includes a processor 202 in communication with a mass memory 226 via a bus 234. In some embodiments, processor 202 may include one or more central processing units (CPU). Client computer 207 also includes a power supply 228, one or more network interfaces 236, an audio interface 238, a display 240, a keypad 242, an illuminator 244, a video interface 246, an input/output interface 248, a haptic interface 250, and a global positioning system (GPS) transceiver 232.

Power supply 228 provides power to client computer 207. A rechargeable or non-rechargeable battery may be used to provide power. The power may also be provided by an external power source, such as an alternating current (AC) adapter or a powered docking cradle that supplements and/or recharges a battery.

Client computer 207 may optionally communicate with a base station (not shown), or directly with another computer. Network interface 236 includes circuitry for coupling client computer 207 to one or more networks, and is constructed for use with one or more communication protocols and technologies including, but not limited to, GSM, CDMA, TDMA, GPRS, EDGE, WCDMA, HSDPA, LTE, user datagram protocol (UDP), transmission control protocol/Internet protocol (TCP/IP), short message service (SMS), WAP, ultrawide band (UWB), IEEE 802.16 Worldwide Interoperability for Microwave Access (WiMax), session initiated protocol/real-time transport protocol (SIP/RTP), or any of a variety of other wireless communication protocols. Network interface 236 is sometimes known as a transceiver, transceiving device, or network interface card (NIC).

Audio interface 238 is arranged to produce and receive audio signals such as the sound of a human voice. For example, audio interface 238 may be coupled to a speaker and microphone (not shown) to enable telecommunication with others and/or generate an audio acknowledgement for some action.

Display 240 may be a liquid crystal display (LCD), gas plasma, light emitting diode (LED), organic LED, or any other type of display used with a computer. Display 240 may also include a touch sensitive screen arranged to receive input from an object such as a stylus or a digit from a human hand.

Keypad 242 may comprise any input device arranged to receive input from a user. For example, keypad 242 may include a push button numeric dial, or a keyboard. Keypad 242 may also include command buttons that are associated with selecting and sending images.

Illuminator 244 may provide a status indication and/or provide light. Illuminator 244 may remain active for specific periods of time or in response to events. For example, when illuminator 244 is active, it may backlight the buttons on keypad 242 and stay on while the client computer is powered. Also, illuminator 244 may backlight these buttons in various patterns when particular actions are performed, such as dialing another client computer. Illuminator 244 may also cause light sources positioned within a transparent or translucent case of the client computer to illuminate in response to actions.

Video interface 246 is arranged to capture video images, such as a still photo, a video segment, an infrared video, or the like. For example, video interface 246 may be coupled to a digital video camera, a web-camera, or the like. Video interface 246 may comprise a lens, an image sensor, and other electronics. Image sensors may include a complementary metal-oxide-semiconductor (CMOS) integrated circuit, charge-coupled device (CCD), or any other integrated circuit for sensing light.

Client computer 207 also comprises input/output interface 248 for communicating with external devices, such as a headset, or other input or output devices not shown in FIG. 2A. Input/output interface 248 can utilize one or more communication technologies, such as USB, infrared, Bluetooth™, or the like.

Haptic interface 250 is arranged to provide tactile feedback to a user of the client computer. For example, the haptic interface 250 may be employed to vibrate client computer 207 in a particular way when another user of a computing computer is calling. In some embodiments, haptic interface 250 may be optional.

Client computer 207 may also include GPS transceiver 232 to determine the physical coordinates of client computer 207 on the surface of the Earth. GPS transceiver 232, in some embodiments, may be optional. GPS transceiver 232 typically outputs a location as latitude and longitude values. However, GPS transceiver 232 can also employ other geo-positioning mechanisms, including, but not limited to, triangulation, assisted GPS (AGPS), Enhanced Observed Time Difference (E-OTD), Cell Identifier (CI), Service Area Identifier (SAI), Enhanced Timing Advance (ETA), Base Station Subsystem (BSS), or the like, to further determine the physical location of client computer 207 on the surface of the Earth. It is understood that under different conditions, GPS transceiver 232 can determine a physical location within millimeters for client computer 207; and in other cases, the determined physical location may be less precise, such as within a meter or significantly greater distances. In one embodiment, however, client computer 207 may through other components, provide other information that may be employed to determine a physical location of the computer, including for example, a Media Access Control (MAC) address, IP address, or the like.

Mass memory 226 includes a Random Access Memory (RAM) 204, a Read-only Memory (ROM) 222, and other storage means. Mass memory 226 illustrates an example of computer readable storage media (devices) for storage of information such as computer readable instructions, data structures, program modules or other data. Mass memory 226 stores a basic input/output system (BIOS) 224 for controlling low-level operation of client computer 207. The mass memory also stores an operating system 256 for controlling the operation of client computer 207. It will be appreciated that this component may include a general-purpose operating system such as a version of UNIX, or LINUX™, or a specialized client communication operating system such as Microsoft Corporation's Windows Mobile™, Apple Corporation's iOS™, Google Corporation's Android™ or the Symbian® operating system. The operating system may include, or interface with a Java virtual machine module that enables control of hardware components and/or operating system operations via Java application programs.

Mass memory 226 further includes one or more data storage 208, which can be utilized by client computer 207 to store, among other things, applications 214 and/or other data. For example, data storage 208 may also be employed to store information that describes various capabilities of client computer 207. The information may then be provided to another computer based on any of a variety of events, including being sent as part of a header during a communication, sent upon request, or the like. Data storage 208 may also be employed to store social networking information including address books, buddy lists, aliases, user profile information, or the like. Further, data storage 208 may also store message, web page content, or any of a variety of user generated content. At least a portion of the information may also be stored on another component of client computer 207, including, but not limited to processor readable storage media 230, a disk drive or other computer readable storage devices (not shown) within client computer 207.

Processor readable storage media 230 may include volatile, nonvolatile, removable, and non-removable media implemented in any method or technology for storage of information, such as computer- or processor-readable instructions, data structures, program modules, or other data. Examples of computer readable storage media include RAM, ROM, Electrically Erasable Programmable Read-only Memory (EEPROM), flash memory or other memory technology, Compact Disc Read-only Memory (CD-ROM), digital versatile disks (DVD) or other optical storage, magnetic cassettes, magnetic tape, magnetic disk storage or other magnetic storage devices, or any other physical medium which can be used to store the desired information and which can be accessed by a computer. Processor readable storage media 230 may also be referred to herein as computer readable storage media and/or computer readable storage device.

Applications 214 may include computer executable instructions which, when executed by client computer 207, transmit, receive, and/or otherwise process network data. Network data may include, but is not limited to, messages (e.g. SMS, Multimedia Message Service (MMS), instant message (IM), email, and/or other messages), audio, video, and enable telecommunication with another user of another client computer. Applications 214 may include, for example, browser 218, and other applications 220. Other applications 220 may include, but are not limited to, calendars, search programs, map programs, email clients, IM applications, SMS applications, voice over Internet Protocol (VOIP) applications, contact managers, task managers, transcoders, database programs, word processing programs, security applications, spreadsheet programs, games, search programs, and so forth.

Browser 218 may include virtually any application configured to receive and display graphics, text, multimedia, messages, and the like, employing virtually any web-based language. In one embodiment, the browser application is enabled to employ HDML, WML, WMLScript, JavaScript, SGML, HTML, XML, and the like, to display and send a message. However, any of a variety of other web-based programming languages may be employed. In one embodiment, browser 218 may enable a user of client computer 207 to communicate with another network computer, such as Hub Server Computer 112 of FIG. 2A.

Applications 214 may also include Widget Controller 210 and one or more Widgets 212. Widgets 212 may be collections of content provided to the client computer 207 by Hub Server Computer 112. Widget Controller 210 may be a program that may be provided to the client computer by Hub Server Computer 112. Widget Controller 210 and Widgets 212 may run as native client computer applications, or they may run in Browser 218 as web browser-based applications. Also, Widget Controller 210 and Widgets 212 may be arranged to run as native applications or web browser applications, or combination thereof. In at least one of the various embodiments, Applications and their components can be configured as Widgets.

Applications 214 can also include a Platform Application 215. Platform Application 215 can be a program that may be provided to the client computer by the platform, for example by Hub Server Computer 112, and supported by an Application Server of Hub Server Computer 112. Platform Application 215 can run as a native client computer application or can run in Browser 218 as a web browser-based application. Platform Application 215 can also be arranged to run as a combination of a native application and a web browser application. Platform Application 215 and its tools and modules may employ processes, or parts of processes, similar to those described in conjunction with FIGS. 1A-2A and FIGS. 3-10, to perform at least some of its actions.

A Distributed Immutable Ledger Application 217 is configured to provide a gateway to decentralized applications on the Distributed Immutable Ledger platform and act as a node on the Distributed Immutable Ledger platform. The Distributed Immutable Ledger Application 217 application is configured to hold and secure crypto-assets built on the platform, as well as to code, deploy and employ, inter alia, self-executing smart contracts.

The Distributed Immutable Ledger Application 217 can include a data management tool 256 configured to record application usage and transaction data to the distributed immutable ledger network 203. The data management tool 256 can be configured to communicate with the Distributed Immutable Ledger Computer Servers and the Hub Server Computer 112 to control, share, accept, and synchronize data. In an embodiment, the data management tool 256 can include a logging tool configured to log and store client data in one or more databases, for example a client database 209, including client transactions recorded on the distributed immutable ledger network 203. The logging tool can also be configured to log transactions between clients on the distributed immutable ledger 211. As noted herein, in at least one of the various embodiments, the platform includes a Distributed Immutable Ledger Application 217 can which operates as a platform Node Server 205, which is a permissioned Distributed Immutable Ledger Computer Server node.

The Distributed Immutable Ledger Application 217 can include a transaction interface tool 264 for entering into transactions that are recorded on the distributed immutable ledger, including transactions such as smart contracts and/or cryptocurrency transactions.

Illustrative Network Computer

Figure 2C:
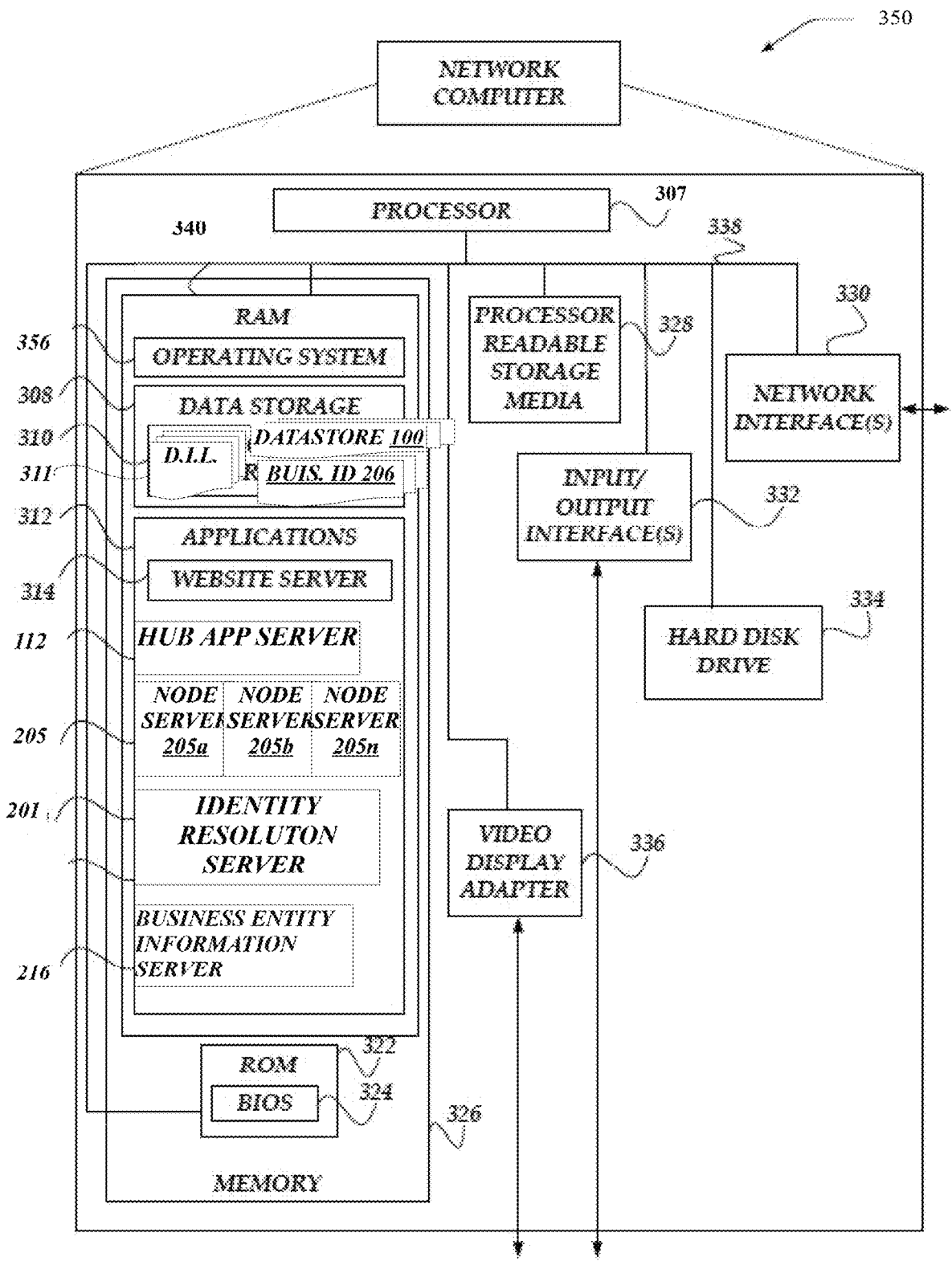
FIG. 2C depicts an exemplary network computer according to the present disclosure.

FIG. 2C shows one embodiment of a Network computer 350, according to one embodiment of the invention. Network computer 350 may include many more or less components than those shown. The components shown, however, are sufficient to disclose an illustrative embodiment for practicing the innovations disclosed herein. Network computer 350 may be configured to operate as a server, client, peer, a host, or any other computer. Network computer 350 may represent, for example Hub Server Computer 112, Business Entity Data Server 206, Node Server 205; and Identification Resolution Server 201.

Network computer 350 includes processor 307, processor readable storage media 328, network interface unit 330, an input/output interface 332, hard disk drive 334, video display adapter 336, and memory 326, all in communication with each other via bus 338. In some embodiments, processor 307 may include one or more central processing units.

As illustrated in FIG. 2C, network computer 350 also can communicate with the Internet, or some other communications network, via network interface unit 330, which is constructed for use with various communication protocols including the TCP/IP protocol. Network interface unit 330 is sometimes known as a transceiver, transceiving device, or network interface card (NIC).

Network computer 350 also comprises input/output interface 332 for communicating with external devices, such as a keyboard, or other input or output devices not shown in FIG. 2C. Input/output interface 332 can utilize one or more communication technologies, such as USB, infrared, Bluetooth™, or the like.

Memory 326 generally includes RAM 340, ROM 322 and one or more permanent mass storage devices, such as hard disk drive 334, tape drive, optical drive, and/or floppy disk drive. Memory 326 stores operating system 356 for controlling the operation of network computer 350. Any general-purpose operating system may be employed. Basic input/output system (BIOS) 324 is also provided for controlling the low-level operation of network computer 350.

Although illustrated separately, memory 326 may include processor readable storage media 328. Processor readable storage media 328 may be referred to and/or include computer readable media, computer readable storage media, and/or processor readable storage device. Processor readable storage media 328 may include volatile, nonvolatile, removable, and non-removable media implemented in any method or technology for storage of information, such as computer readable instructions, data structures, program modules, or other data. Examples of processor readable storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information, and which can be accessed by a computer.

Memory 326 further includes one or more data storage 308, which can be utilized by network computer 350 to store, among other things, applications 312 and/or other data such as content 310. For example, data storage 308 may also be employed to store information that describes various capabilities of network computer 350. The information may then be provided to another computer based on any of a variety of events, including being sent as part of a header during a communication, sent upon request, or the like. Data storage 308 may also be employed to store messages, web page content, or the like. At least a portion of the information may also be stored on another component of network computer 350, including, but not limited to processor readable storage media 328, hard disk drive 334, or other computer readable storage medias (not shown) within client computer.

Data storage 308 may include a database, text, spreadsheet, folder, file, or the like, that may be configured to maintain and store user account identifiers, user profiles, email addresses, IM addresses, and/or other network addresses; or the like.

In at least one of the various embodiments, data storage 308 may include business information database 206, which can contain information analytics services (e.g., scores, and rankings) as described herein.

Data storage 308 can also include datastore 100, which is stored as a lookup table, as described herein, including with respect to FIGS. 1A-1B.

Data storage 308 can also include distributed immutable ledger information 311 for the networks 203a . . . n that the Hub Server Computer 112 has been given access to and has nodes 205a . . . n. For each distributed immutable ledger network 203a . . . n, a separate server 205a, 205b . . . 205n will run so as to host a connected node to networks 203a . . . n. These servers will be connected to Hub Server Computer 112 through communications over common communication protocols. As will be appreciated, though each node server is separate, the node servers can be hosed on the same system Data storage 308 may further include program code, data, algorithms, and the like, for use by a processor, such as processor 307 to execute and perform actions. In one embodiment, at least some of data storage 308 might also be stored on another component of network computer 350, including, but not limited to processor-readable storage media 328, hard disk drive 334, or the like.

Applications 312 may include computer executable instructions, which may be loaded into mass memory and run-on operating system 356. Examples of application programs may include transcoders, schedulers, calendars, database programs, word processing programs, Hypertext Transfer Protocol (HTTP) programs, customizable user interface programs, IPSec applications, encryption programs, security programs, SMS message servers, IM message servers, email servers, account managers, and so forth. Applications 312 may also include website server 314, Hub Server Application 112, ID Resolution Server 201, Node Servers 205a . . . n, and Business Entity Information Server 216. Application Servers may be configured to support and provide content to client applications and for application tools and modules as described herein. Application Servers may employ processes, or parts of processes, similar to those described in conjunction with FIGS. 3-10, to perform at least some of its actions.

The Node Server Application 205a . . . n can include a Distributed Immutable Ledger Application comprising a data management tool configured to record application usage and transaction data to the distributed immutable ledger network 203 associated with the client business entities. The data management tool can be configured to communicate with the Distributed Immutable Ledger Computer Servers and the Hub Server Computer 112 to control, share, accept, and synchronize data. In an embodiment, the data management tool can include a logging tool configured to log and store data in one or more databases 308, including client transactions recorded on the distributed immutable ledger network 203. The logging tool can also be configured to log transactions between clients on the distributed immutable ledger. In at least one of the various embodiments, the platform Node Server Application is permissioned as a Distributed Immutable Ledger Computer Server node.

The platform Node Server Application 205a . . . n can include a transaction interface tool 264 for entering into transactions that are recorded on the distributed immutable ledger, including transactions such as smart contracts and/or cryptocurrency transactions.

Website server 314 may represent any of a variety of information and services that are configured to provide content, including messages, over a network to another computer. Thus, website server 314 can include, for example, a web server, a File Transfer Protocol (FTP) server, a database server, a content server, or the like. Website server 314 may provide the content including messages over the network using any of a variety of formats including, but not limited to WAP, HDML, WML, SGML, HTML, XML, Compact HTML (cHTML), Extensible HTML (xHTML), or the like.

The operation of certain aspects of the invention will now be described with respect to FIGS. 3-10. In at least one of the various embodiments, for processes 300, 400, 500, 600, 700, 800, 900, and 1000, these processes or portions of these processes may be implemented by and/or executed on a plurality of network computers, such as client computer of FIG. 2B and network computer 350 of FIG. 2C. However, embodiments are not so limited, and various combinations of network computers, client computers, virtual machines, or the like may be utilized. Further, in at least one of the various embodiments, the processes described in conjunction with FIGS. 3-10 can be operative in a system with logical architectures such as those described in conjunction with FIGS. 1-2A.

Figure 3:
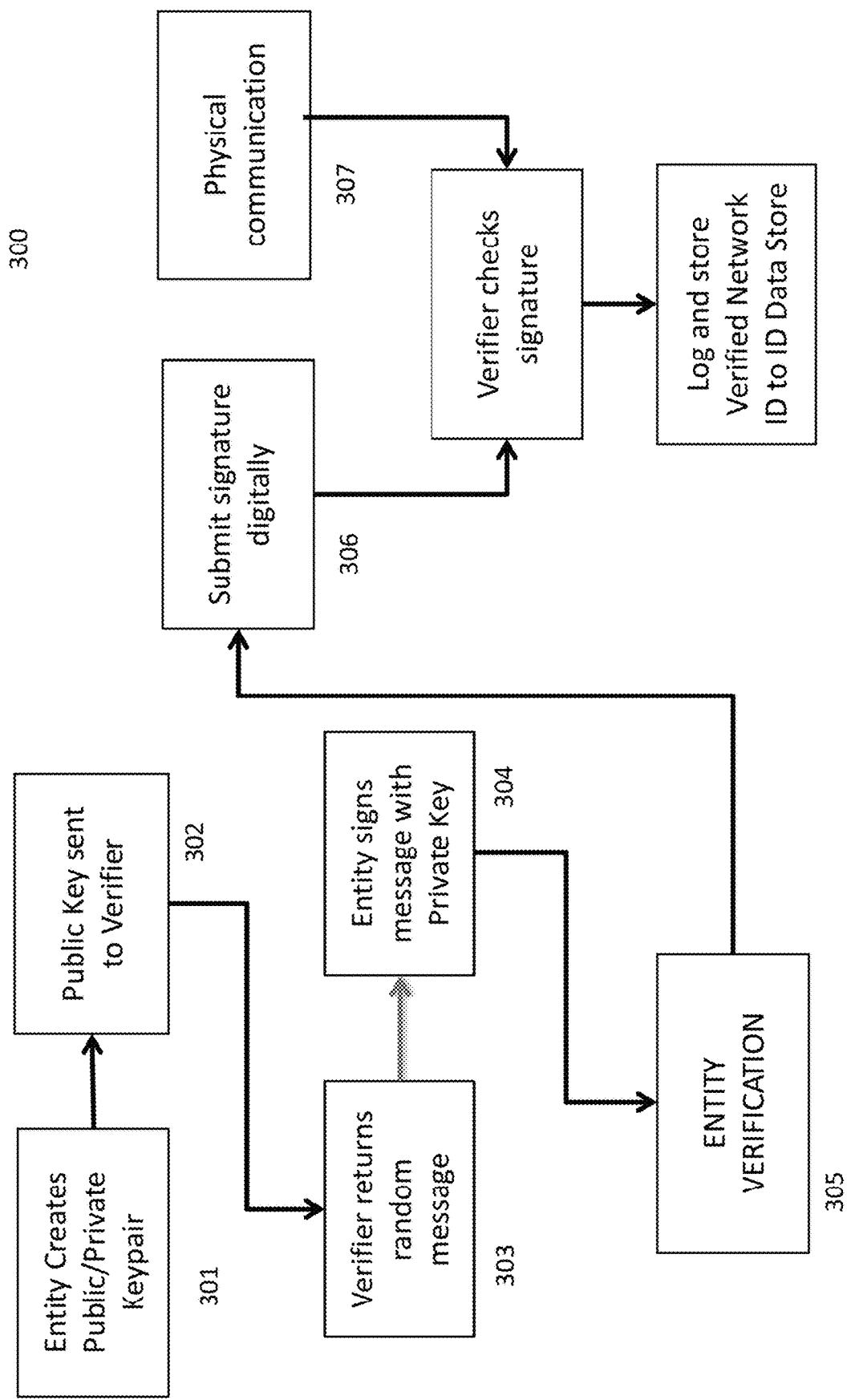
FIG. 3 is a block diagram depicting the verification of an entity through a registered communication protocol according the present disclosure.

FIG. 3 is a block diagram depicting a process 300 for verification of an entity according the present disclosure.

At block 301, an entity creates a public/private keypair for a distributed immutable ledger network. In an embodiment, the platform host can act as a verification host. At block 302, the public key is sent to the hub server 112, via the verification host's node 205 on the distributed immutable ledger network or through a direct communication to an internet hosted platform with access to the hub server 112. At block 303, the verification host generates and returns a randomly generated verification message. At block 304, the entity signs the verification message with the private key.

At block 305, entity verification starts. The entity submits the signature for verification. Entity verification can include verification through a registered communication protocol or through physical communication. For example, for a registered digital communication protocol, at block 306 the system can be configured such that the entity can submit the signature on a domain they control or by the entity utilizing a registered phone number to text signature data. At block 307, for a verification of an entity through a physical communication (e.g., spoken or written), the entity can, for example, visit a physical site of the verification host to confirm the signature or utilize a registered phone number to verbally confirm the signature. At block 308, the verification host checks the signature submitted by the entity. At block 309, the verification host logs and stores Verified Network ID to the entity's ID data store 100.

Figure 4:
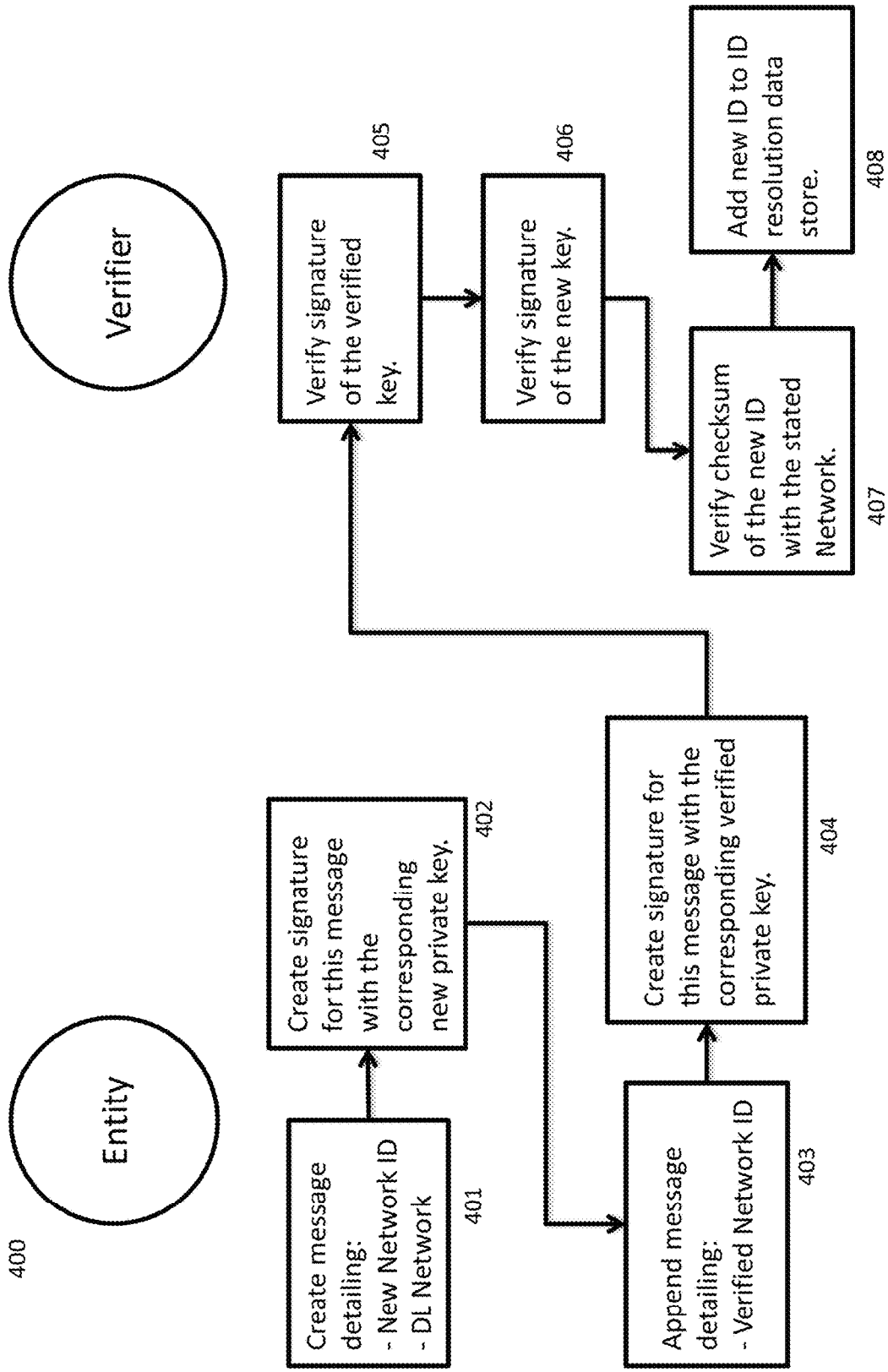
FIG. 4 is a block diagram depicting the verification of an entity through a communication according to the present disclosure.

FIG. 4 is a block diagram depicting a process 300 for the verification of a new distributed ledger identification with an already verified identification. At block 401, the entity creates a message including information for a Distributed Ledger Address 102 for a Distributed Ledger Network. At block 402, the entity generates a signature for the message with this new private key. At block 403, the entity then appends a message detailing a Verified Distributed Ledger Address 102. At block 404 the entity then creates a signature for the Verified Distributed Ledger Address 102 message with a corresponding Verified private key. At block 405, the verification host verifies the signature of the Verified private key generated at block 404. At block 406, the verification host verifies the signature of the new key generated at block 402. At block 407, the verification host verifies a checksum of the Distributed Ledger Address with the Network identified in the Distributed Ledger Address. At block 408, the verification host adds a new Distributed Ledger Address 102 to the ID resolution data store 100 for the entity.

Figure 5:
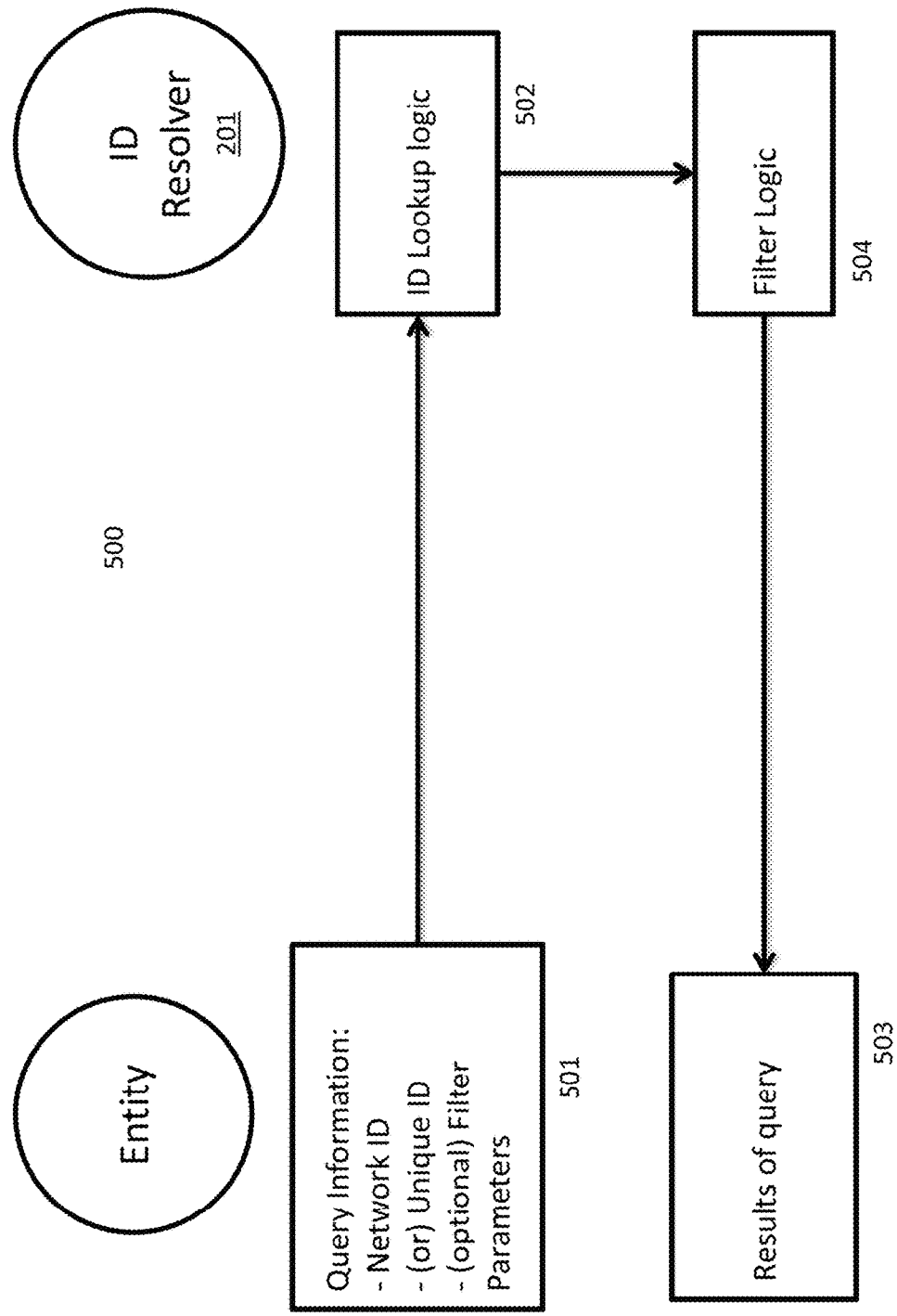
FIG. 5 is a block diagram depicting the verification of a new distributed ledger identification with an already verified identification.

FIG. 5 is a block diagram depicting a process 500 for the retrieval of an Entity ID 101 from a system according to the present disclosure. At block 501, the entity generates and sends a search query message to the ID Resolution Server 201 including a Distributed Ledger Address 102 or a Unique Entity ID 101, and, optionally, filter parameters. At block 502 the ID Resolution Server 201 runs the ID lookup logic to identify the Distributed Ledger Address 102 or Unique ID 101 meeting the Search Query parameters on the datastore 100. At block 504, the ID Resolution Server 201 runs the filter logic of the search, if any, to filter the search results identified at block 502. At block 503, Distributed Ledger Address 102 and/or Unique ID 101 search results identified in the search are sent to the entity.

Figure 6:
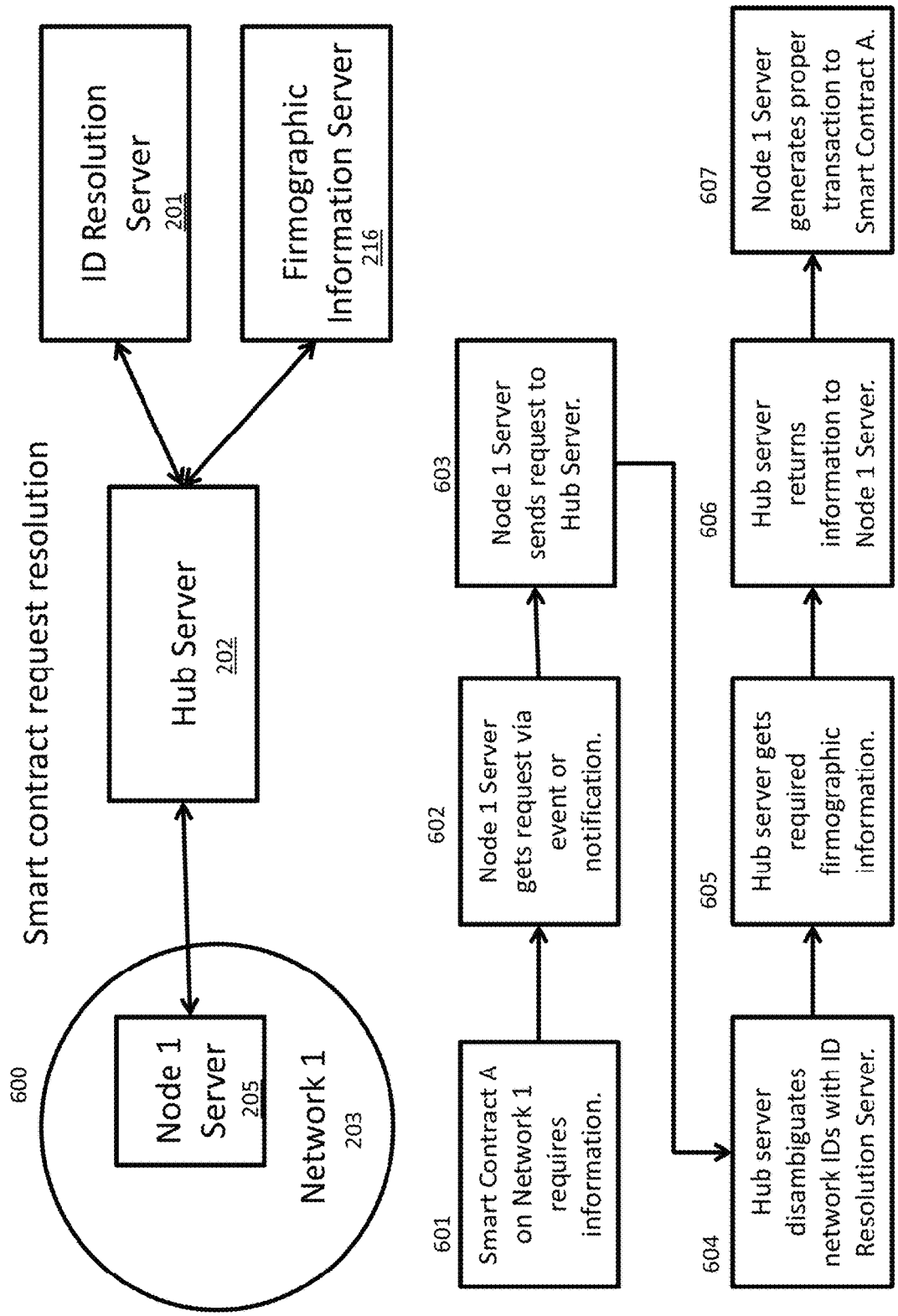
FIG. 6 is a block diagram depicting the retrieval of a network identification from a system according to the present disclosure.

FIG. 6 is a block diagram depicting a process 600 for a smart contract request resolution according to the present disclosure. At block 601, Smart Contract is entered on Network 1 by a party, which triggers an information event for the Smart Contract, for example, a request or opportunity to transact on the Smart Contract. At block 602, an entity Node Server 205 gets a Smart Contract request via the event or other notification. At block 603, a Node Server 205 sends the request to the Hub Server 112. At block 604, the Hub Server 112 disambiguates the Distributed Ledger Address 102 with the ID Resolution Server 201 as described with respect to FIG. 5. At block 605 the Hub Server obtains firmographic information from the Firmographic Information Server 216 about the entity and enriches information about, inter alia, the entities who are party to the Smart Contract. Non limiting examples of company entity data linking, generating firmographic databases and scoring for companies, and data integration by business entity information database 206 and a business analytics server are described in U.S. Pat. No. 7,822,757, filed on Feb. 18, 2003 entitled System and Method for Providing Enhanced Information, U.S. Pat. No. 8,346,790, filed on Sep. 28, 2010 and entitled Data Integration Method and System, and U.S. Pat. No. 8,036,907 filed on Dec. 23, 2003 and entitled Method and System for Linking Business Entities Using Unique Identifiers, the entirety of each of which is incorporated by reference herein. At block 606, the Hub Server 606 returns the enriched information to the Node Server. At block 607, the Node Server 205 generates a transaction to the Smart Contract.

Figure 7:
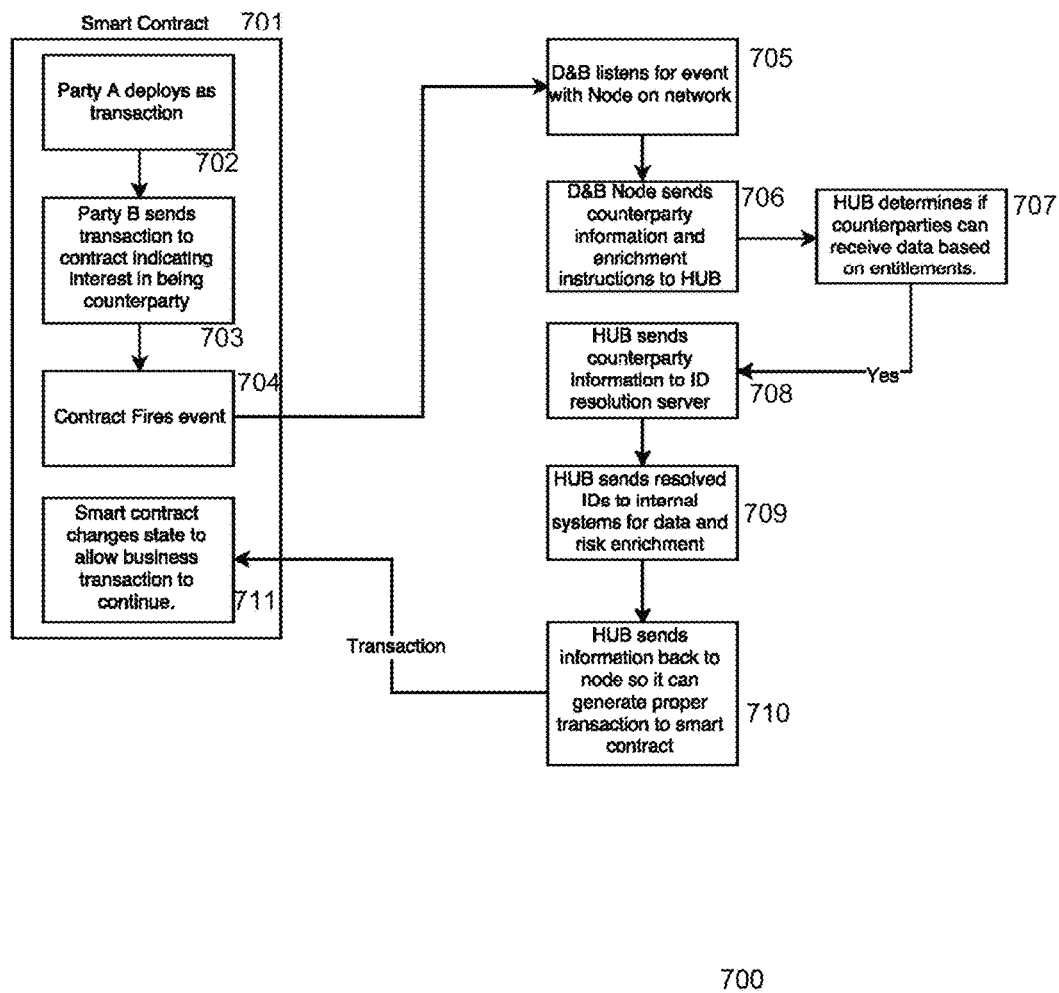
FIG. 7 is a block diagram depicting a smart contract request resolution according to the present disclosure.

FIG. 7 is a block diagram depicting a process 700 for a smart contract request resolution according to the present disclosure. At block 701, a Smart Contract is entered on Network 1. At block 702 a first Party A deploys an offer to transact on the Smart Contract. At block 703, second Party B sends a transaction offer to the Smart Contract, indicating and interest to be a counterparty to the transaction. At block

704, Party B's message triggers an information event for the Smart Contract, a request to transact on the Smart Contract. At block 705, the Node Server 205 gets the Smart Contract request via the event or other notification. As described herein, the Node Server 205 can be configured to listen for events on the Smart Contract, for example, additions of counterparties, other changes of Smart Contract state, updated contract requirements, an example of which is shown with respect to FIG. 9.

At block 706, the Node Server 205 sends the request including the counterparty B information and enrichment instructions to the Hub Server 112. At block 707, the Hub Server 112 determines if the counterparties to the Smart Contract are authorized to receive the enrichment data. If so, at block 708 the Hub Server sends the counterparty information to the ID Resolution Server 201 to disambiguate the Network IDs with the ID Resolution Server as described with respect to FIG. 5. At block 709, the Hub Server uses the resolved IDs to obtain firmographic information from the Firmographic Information Server 216 about the entity and enriches information about, inter alia, the entities who are party to the Smart Contract. At block 710, the Hub Server 112 returns the enriched information to the Node Server 205. At block 711, the Node Server 205 can use the enrichment data to take an action or generate a transaction to the Smart Contract. For example, the enrichment data can be employed change or add information to the Smart Contract (e.g., State, party name, financial terms, corporate and business linkage information, for example, linking business relationships, etc.) that allows a transaction on the Smart Contract to proceed or execute.

Figure 8:
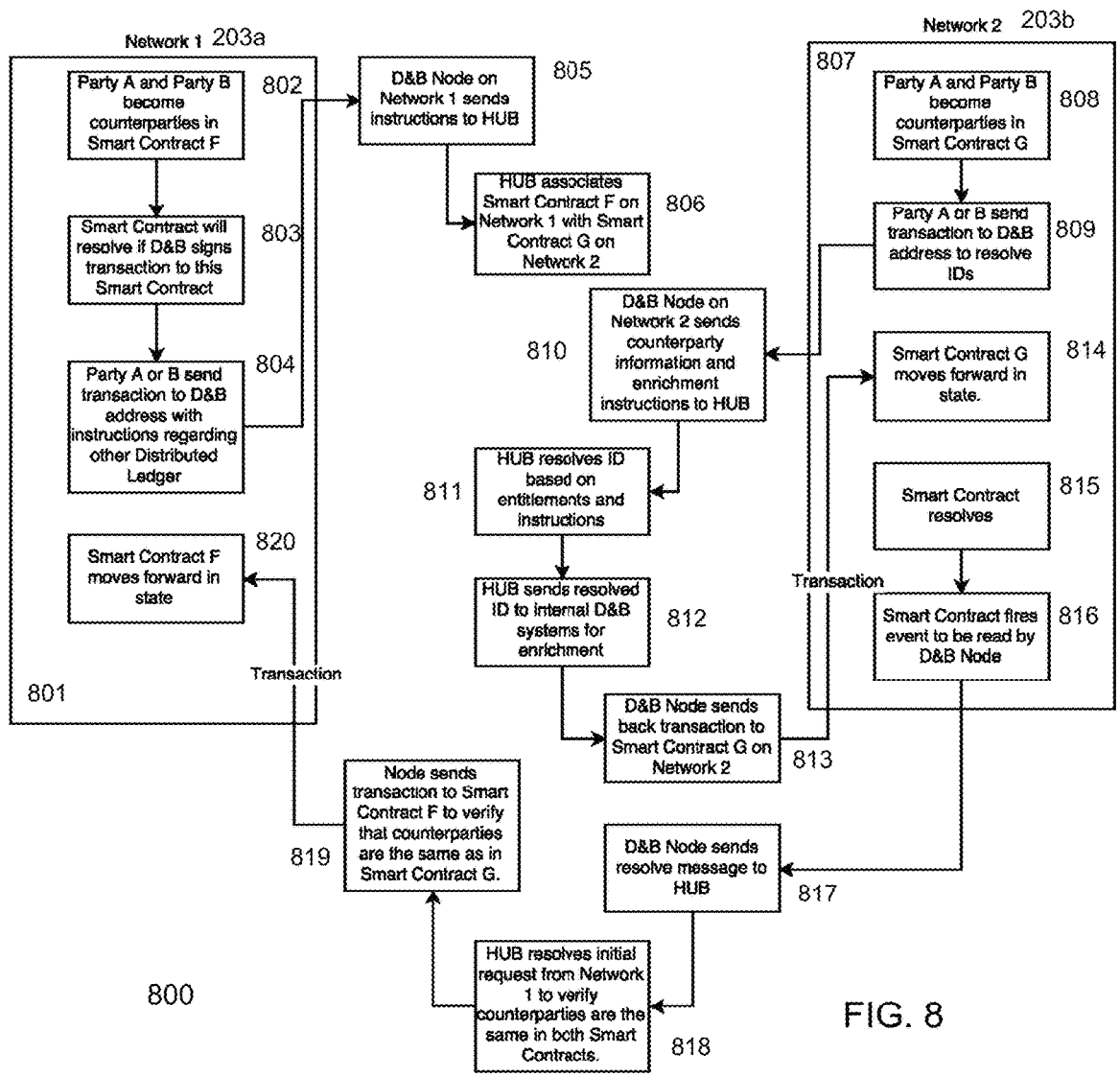
FIG. 8 is a diagram depicting leveraging a distributed immutable ledger or blockchain and smart contracts according to the present disclosure.

FIG. 8 is a block diagram depicting a process 700 for a smart contract request resolution according to the present disclosure. At block 801, a first Smart Contract F is entered on a first Distributed Ledger Distributed Ledger Network 203a. At block 802, the Parties A and B become counterparties to Smart Contract F. At block 803, the Smart Contract F is configured to resolve if the verification platform host signs a transaction to the Smart Contract F. At block 804, Party A or Party B sends a transaction request message to the Network Node Server 205a on the first Distributed Ledger Network 203a with instructions to verify that both parties are counter parties on a Smart Contract G on a different Distributed Ledger Network 203b. At block 805, the Node Server 205a sends a message with the instruction to the Hub Server 112. At block 806, the Hub Server 112 associates Smart Contract F with Smart Contract G on Network 2. The instructions from the Node Server 205a are explicit. A counterparty identifies Smart Contract G and its network in an update to Smart Contract F.

At block 807, a Smart Contract G is entered on a second Distributed Ledger Network 203b. At block 808, the Parties A and B become counterparties to Smart Contract G. At block 809, Party A or Party B sends a transaction message to the Network Node Server 205a on Network 1 with instructions to resolve the Entity IDs. At block 810, the Node Server 205b on the second Distributed Ledger Network 203b sends a message with counterparty information and enrichment instructions to the Hub Server 112. At block 811, the Hub Server sends the counterparty information to the ID Resolution Server 201 to disambiguate the Network IDs with the ID Resolution Server as described with respect to FIG. 7, which resolves the ID in based on entitlements and verification and the instructions. At block 812, the Hub Server uses the resolved IDs to obtain firmographic information from the Business Entity Information Server 216 about the entity and enriches information about, inter alia, the entities who are party to the Smart Contract as described herein. Non limiting examples of company entity data linking, generating firmographic databases and scoring for companies, and data integration by business entity information database 206 and a business analytics server are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, and U.S. Pat. No. 8,036,907 filed on Dec. 23, 2003 and entitled Method and System for Linking Business Entities Using Unique Identifiers, the entirety of each of which is incorporated by reference herein. At block 813, the Node Server sends an enriched transaction message back to the Smart Contract G on the second Distributed Ledger Network 203b. At block 814 Smart Contract G to proceeds based on the verification and enrichment in the transaction message.

At block 815, Smart Contract G between Party A and Party B resolves. At block 816, the resolution of Smart Contract G triggers an event to the Node Server 205b on the second Distributed Ledger Network 203b. At block 817, Node Server 205b on the second Distributed Ledger Network 203b in turn sends a "resolve" message to the Hub Server 112. At block 818, the Hub Server 112 resolves the initial request from the transaction request message from Network Node Server 205a on the first Distributed Ledger Network 203a with instructions to verify that both parties are counter parties on a Smart Contract G on a different Distributed Ledger Network 203b at block 805. At block 819, Network Node Server 205a on the first Distributed Ledger Network 203a receives the confirmation from the Hub Server's resolution and sends a transaction message to Smart Contract F verifying that the counterparties Party A and Party B thereto are the same counterparties in Smart Contract G. At block 820, Smart Contract F receives the transaction message and moves forward based on the verification.

Figure 9:
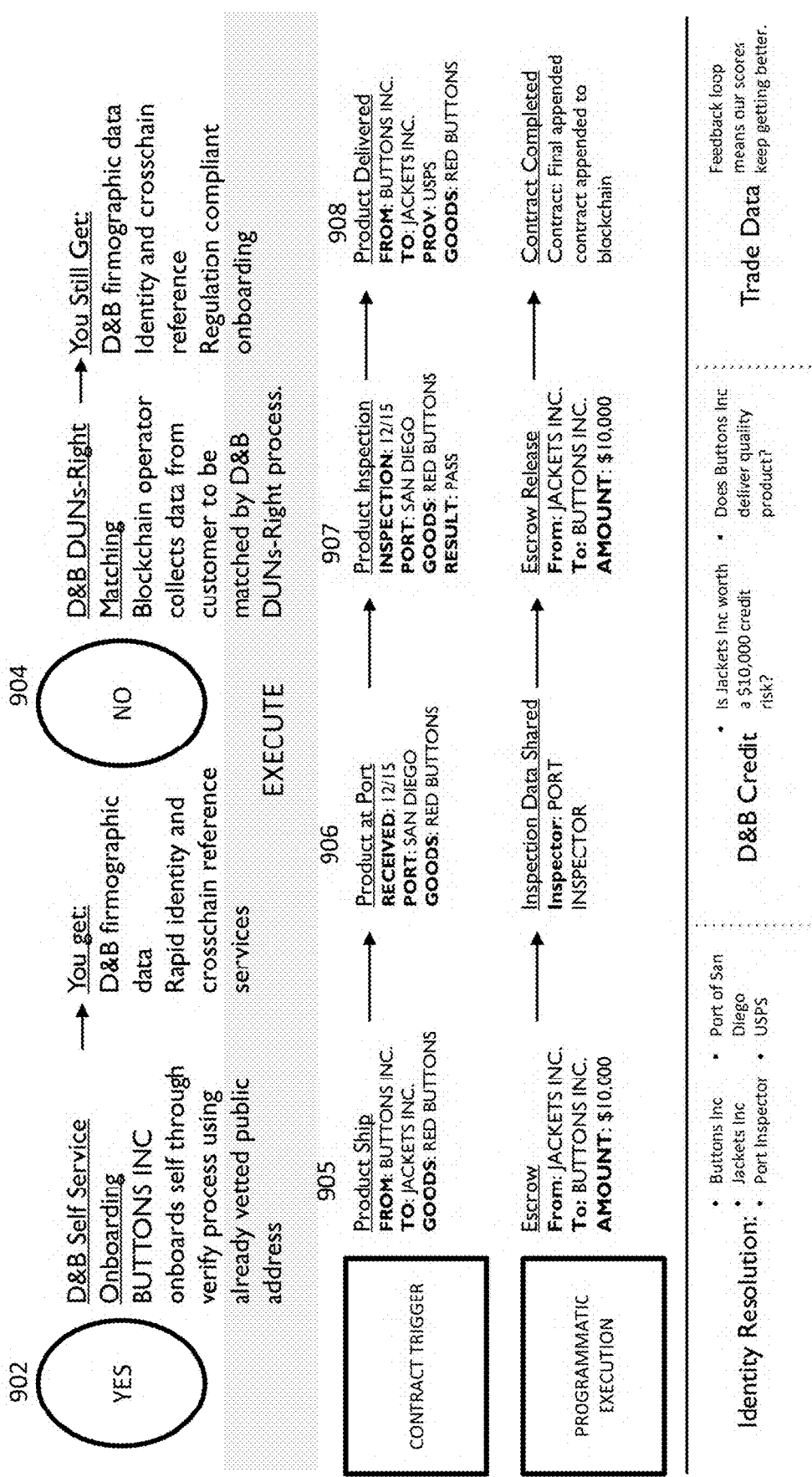
FIG. 9 is a diagram showing distributed immutable ledger or blockchain address registry benefits according to the present disclosure.

FIG. 9 shows an example of a Smart Contract process. For a Smart Contract between Company A (Buttons Inc.) and Company B (Jackets, Inc.) for product shipment and delivery (red buttons), exemplary events triggering the Smart Contract can include Product Shipment, Product at Port, Product Inspection, and Product Delivery. Company B, to engage the Smart Contract, desires identity resolution information and business information for the Smart Contract. In an embodiment, at block 902, Company A (Buttons Inc.) can onboard a through the verification process using an already vetted public address, as described with respect to FIGS. 3 and 4. At block 904, even if Company A does not onboard, the system is configured to perform identity resolution and obtain information from a distributed immutable ledger network operator, which can be matched to firmographic data from a business entity information database 206 as described herein.

The system can then be configured to provide data to enrich company information and cross reference Smart Contracts for automatic execution. For example, at block 905, the Product Shipment, when confirmed to the Network ledger, can trigger, for Company B, an automatic execution of an Escrow transaction (e.g., $10,000). At block 906, the Product at Port, when confirmed to the Network ledger, automatically executes sharing inspection data to the port inspector. At block 907, the Product Inspection confirmation ("PASS") triggers an automatic execution of an Escrow release. At block 908, the Product Delivery message auto executes a completion of the Smart Contract on the ledger.

Figure 10:
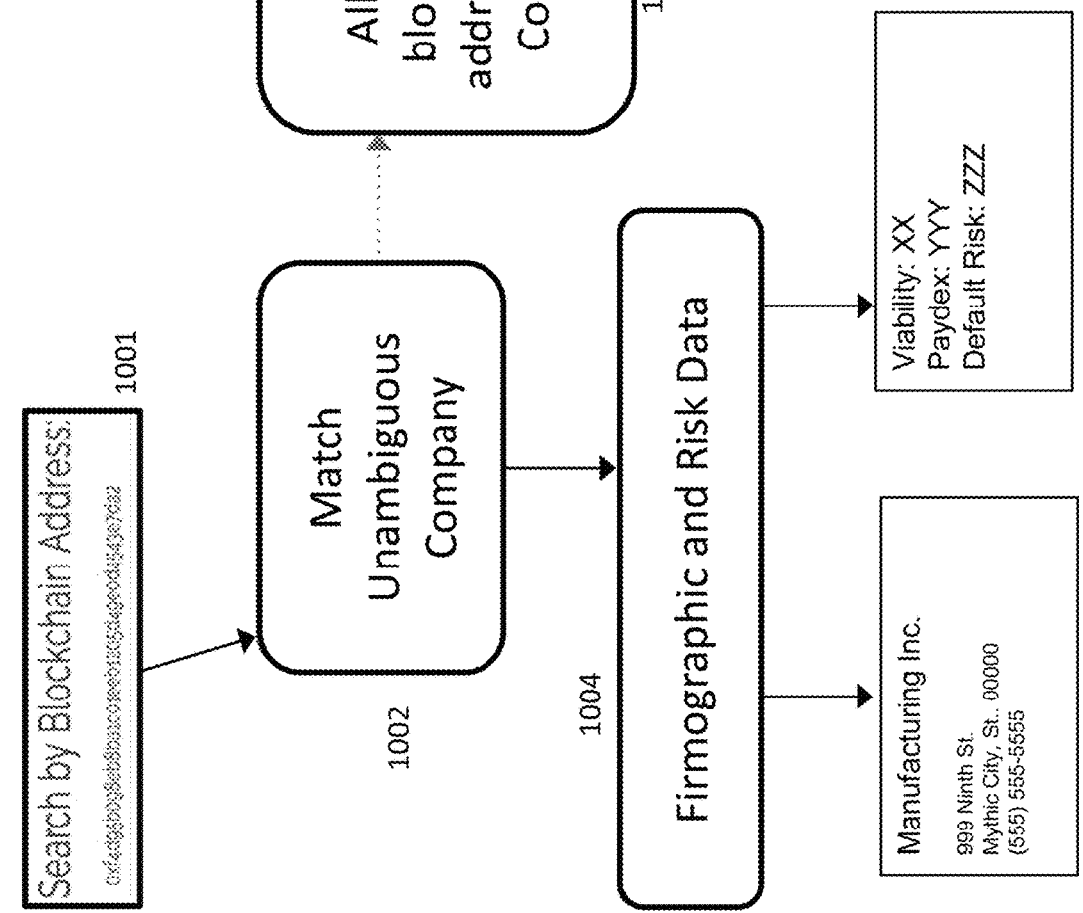
FIG. 10 is a block diagram depicting how to identify a business with their distributed immutable ledger address according to the present disclosure.

FIG. 10 shows an example of a network and business identification in accord with an embodiment. At block 1001, a client device sends a request via network protocols to an identity resolution server 201, for example via the Hub Server 112 as described herein. The request contains an Entity ID 101 or an address of an individual Distributed Ledger account. At block 1002, the hub server 112 matches the company with a business identification number, for example, a DUNS number 106. At block 1003, identity resolution server 201 logic performs a lookup of that Entity ID or address, and if it is found, at block returns to the requester the information associated with that Entity ID 101 or address, including the particular Distributed Ledger network 203 the Network ID 103 belongs to, the entity the Entity ID 101 belongs to, other Distributed Ledger Network IDs 103a . . . n either on the same network 203 or in other networks 203a . . . n, the Distributed Ledger network 203a . . . n each of these IDs belong to. At block 1004, the firmographic data from business entity information database 206 is mapped to the business identification number. Non limiting examples of company entity data linking, generating firmographic databases and scoring for companies, and data integration by business entity information database 206 and a business analytics server are described in U.S. Pat. No. 7,822,757, filed on Feb. 18, 2003 entitled System and Method for Providing Enhanced Information, and U.S. Pat. No. 8,346,790, filed on Sep. 28, 2010 and entitled Data Integration Method and System, and U.S. Pat. No. 8,036,907 filed on Dec. 23, 2003 and entitled Method and System for Linking Business Entities Using Unique Identifiers, the entirety of each of which is incorporated by reference herein. The firmographic or other attribute data (e.g., the company name, address, and ranking/evaluation/risk scores, corporate and business linkage information and linked business relationships such as family-tree relationships parent/subsidiary, corporate families, global headquarters, branches, etc.) associated with the entity that owns the ID is also returned to the requester.

While embodiments are shown and described in accordance with various innovations, it is to be clearly understood that the same may be susceptible to numerous changes apparent to one skilled in the art. Therefore, the present disclosure is not limited to the details shown and described, but also embraces all changes and modifications that come within the scope of the appended claims.

What is claimed is:

1. A method comprising:
providing a hub server connected to an ID resolution server, the ID resolution server being configured to perform identity resolution for a single entity on a plurality of distributed ledger networks; and
connecting a plurality of distributed ledger network platform nodes on each of a respective plurality of the distributed ledger networks to the hub server;
linking a plurality of public key distributed ledger addresses to an Entity ID for an entity;
linking each of the public key distributed ledger addresses to their respective distributed ledger network;
generating a datastore for the Entity ID;
linking each of the public key distributed ledger addresses to their respective distributed ledger network in the datastore;
generating a plurality of the res, and
storing a plurality of the datastores in an identity resolution database lookup table, wherein the ID resolution server comprises the identity resolution database lookup table.

2. A method comprising:
providing a hub server connected to an ID resolution server, the ID resolution server being configured to perform identity resolution for a single entity on a plurality of distributed ledger networks; and
connecting a plurality of distributed ledger network platform nodes on each of a respective plurality of the distributed ledger networks to the hub server;
linking a plurality of public key distributed ledger addresses to an Entity ID for an entity;
linking each of the public key distributed ledger addresses to their respective distributed ledger network;
generating a datastore for the Entity ID;
linking each of the public key distributed ledger addresses to their respective distributed ledger network in the datastore;
embedding the plurality of the distributed ledger network platform nodes on a respective plurality of the distributed ledger networks; and
storing the plurality of the Entity ID datastores in an identity resolution database lookup table.

3. The method of claim 1 further comprising:
obtaining business entity firmographic information about an entity from a business information database server connected to the hub server; and
outputting the business entity firmographic information to the distributed ledger network platform node.

4. A system for verifying entities on a distributed immutable ledger comprising a network computer comprising:
a hub server,
an ID resolution server;
a memory for storing a database and program instructions; and
a processor device that is operative to execute program instructions that enable actions, comprising:
providing a hub server connected to an ID resolution server, the ID resolution server being configured to perform identity resolution for a single entity on a plurality of distributed ledger networks; and
connecting a plurality of distributed ledger network platform nodes on each of a respective plurality of the distributed ledger networks to the hub servers;
linking a plurality of public di addresses to an Entity ID for an entity;
linking each of the public key distributed ledger addresses to their respective distributed ledger network;
generating a datastore for the Entity ID;
linking each of public key distributed ledge addresses their respective distributed ledger network in the datastore;
generating a plurality of the datastores; and
storing a plurality of the datastores in an identity resolution database lookup table, wherein resolution server comprises the identity resolution database lookup table.

5. The system of claim 4, wherein the system is further configured to execute program instructions that enable actions, comprising: embedding a plurality of the distributed ledger network platform nodes on a respective plurality of the distributed ledger networks.

6. The method of claim 2 further comprising:
generating a plurality of the datastores; and
storing a plurality of the datastores in an identity resolution database lookup table, wherein the ID resolution server comprises the identity resolution database lookup table.

* * * * *